United States Patent
Shimada

(10) Patent No.: US 9,588,322 B2
(45) Date of Patent: Mar. 7, 2017

(54) ZOOM LENS, OPTICAL APPARATUS AND MANUFACTURING METHOD FOR THE ZOOM LENS

(71) Applicant: NIKON CORPORATION, Chiyoda-ku, Tokyo (JP)

(72) Inventor: Toshiyuki Shimada, Kawasaki (JP)

(73) Assignee: Nikon Corporation, Tokyo (JP)

(*) Notice: Subject to any disclaimer, the term of this patent is extended or adjusted under 35 U.S.C. 154(b) by 15 days.

(21) Appl. No.: 14/805,458

(22) Filed: Jul. 21, 2015

(65) Prior Publication Data
US 2015/0323771 A1    Nov. 12, 2015

Related U.S. Application Data

(63) Continuation of application No. PCT/JP2014/000302, filed on Jan. 22, 2014.

(30) Foreign Application Priority Data

Jan. 23, 2013   (JP) .................. 2013-010348

(51) Int. Cl.
- G02B 15/14 (2006.01)
- G02B 13/18 (2006.01)
- G02B 13/04 (2006.01)
- G02B 15/177 (2006.01)
- G02B 15/20 (2006.01)

(52) U.S. Cl.
CPC .......... G02B 13/18 (2013.01); G02B 13/04 (2013.01); G02B 15/177 (2013.01); G02B 15/20 (2013.01)

(58) Field of Classification Search
CPC .. G02B 15/173; G02B 15/177; G02B 15/163; G02B 13/22; G02B 15/14

USPC .................. 359/676, 680–682, 683, 689, 694
See application file for complete search history.

(56) References Cited

U.S. PATENT DOCUMENTS

| 2011/0026131 A1 | 2/2011 | Ito | |
|---|---|---|---|
| 2011/0115946 A1* | 5/2011 | Saruwatari | 348/240.3 |
| 2011/0188128 A1 | 8/2011 | Kanazashi | |

(Continued)

FOREIGN PATENT DOCUMENTS

| CN | 102540433 A | 7/2012 |
|---|---|---|
| JP | 2011-33770 A | 2/2011 |

(Continued)

OTHER PUBLICATIONS

International Search Report from International Application No. PCT/JP2014/000302, Mar. 25, 2014.

Primary Examiner — James Greece
(74) Attorney, Agent, or Firm — Shapiro, Gabor and Rosenberger, PLLC

(57) ABSTRACT

Provided is a zoom lens (ZL) including, in order from an object along an optical axis: a first lens group (G1) having negative refractive power; a second lens group (G2) having positive refractive power, and a third lens group (G3) having a positive refractive power. At least the first lens group (G1) and the second lens group (G2) are moved along the optical axis upon zooming from a wide-angle end state to a telephoto end state, so that the distance between the first lens group (G1) and the second lens group (G2) decreases, and the distance between the second lens group (G2) and the third lens group (G3) increases, the first lens (G2) includes one positive lens, and the second lens (G2) includes one negative lens.

23 Claims, 15 Drawing Sheets

(56) References Cited

U.S. PATENT DOCUMENTS

| | | |
|---|---|---|
| 2012/0162776 A1 | 6/2012 | Nanba |
| 2012/0257285 A1 | 10/2012 | Kuzuhara et al. |

FOREIGN PATENT DOCUMENTS

| | | |
|---|---|---|
| JP | 2011-107312 A | 6/2011 |
| JP | 2011-175234 A | 9/2011 |
| JP | 2012-137621 A | 7/2012 |
| JP | 2012-226307 A | 11/2012 |

* cited by examiner

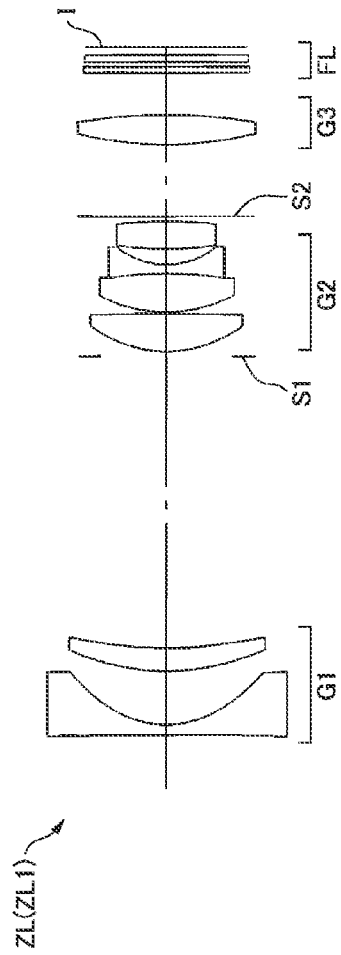
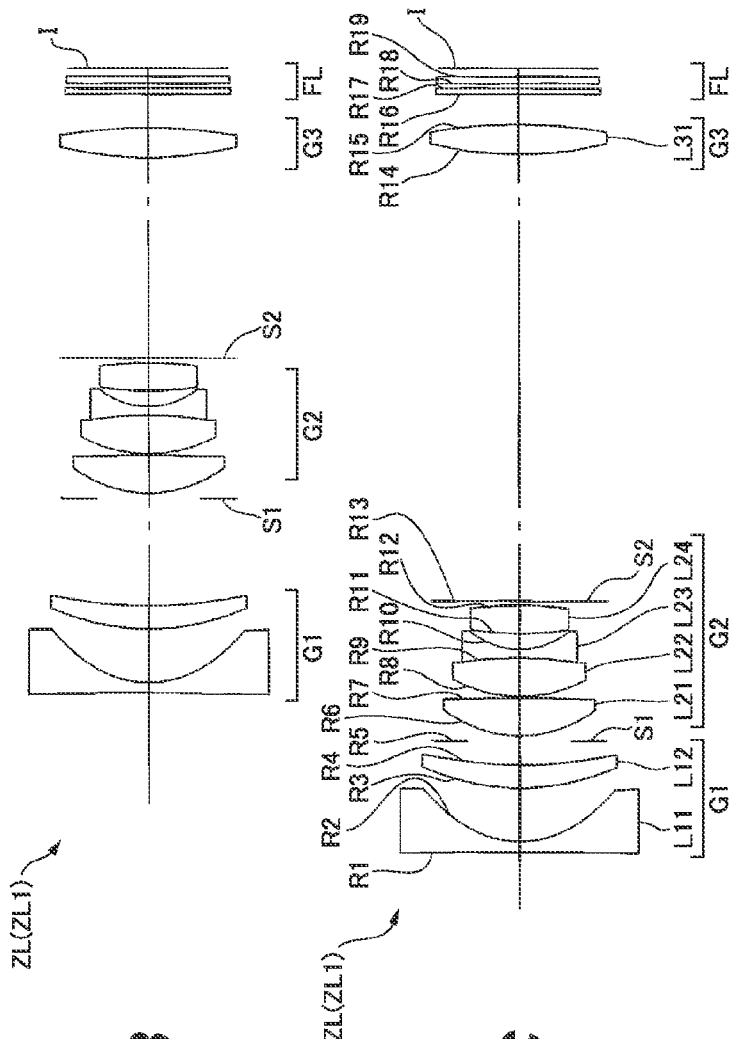
FIG. 1A
FIG. 1B
FIG. 1C

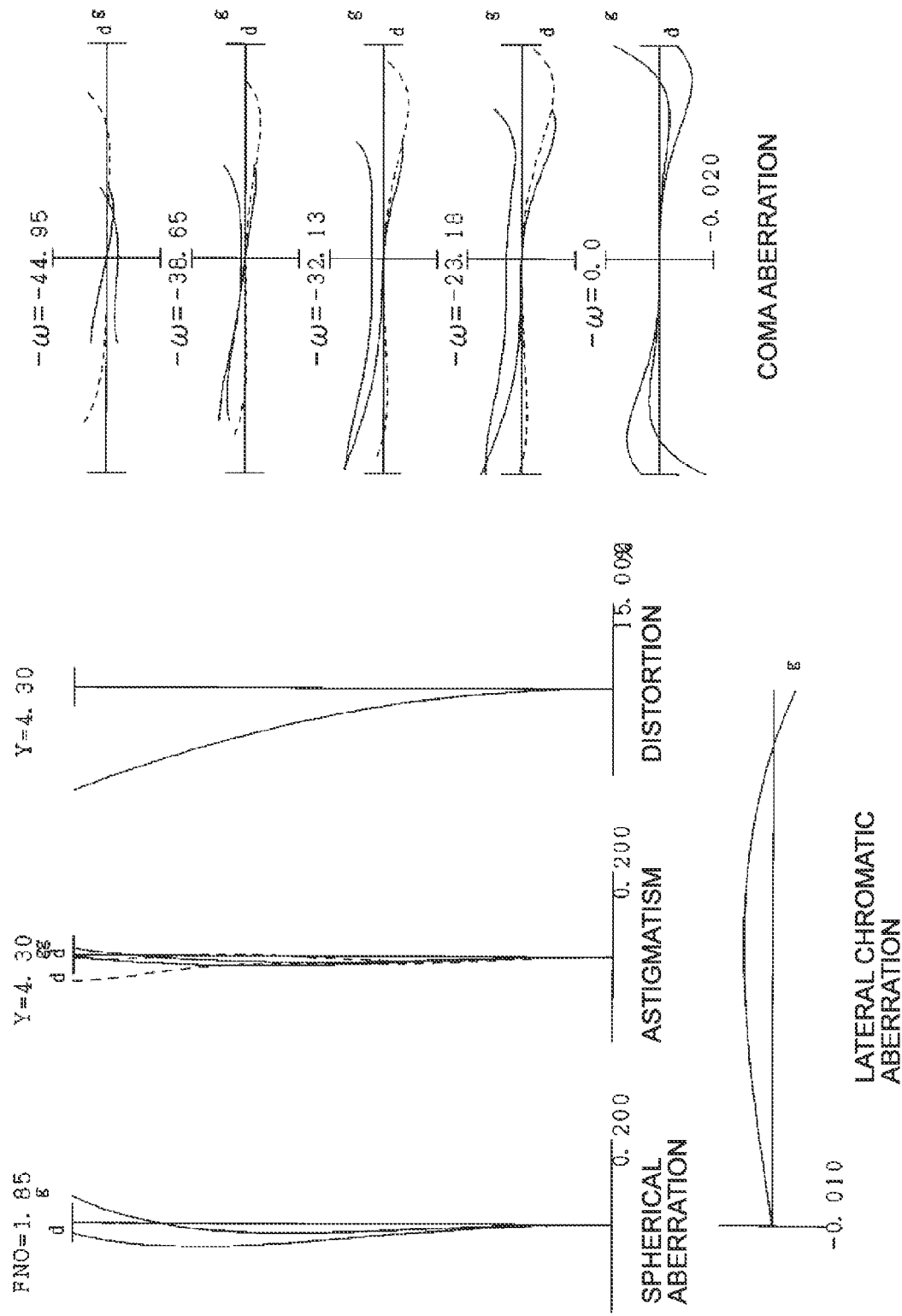

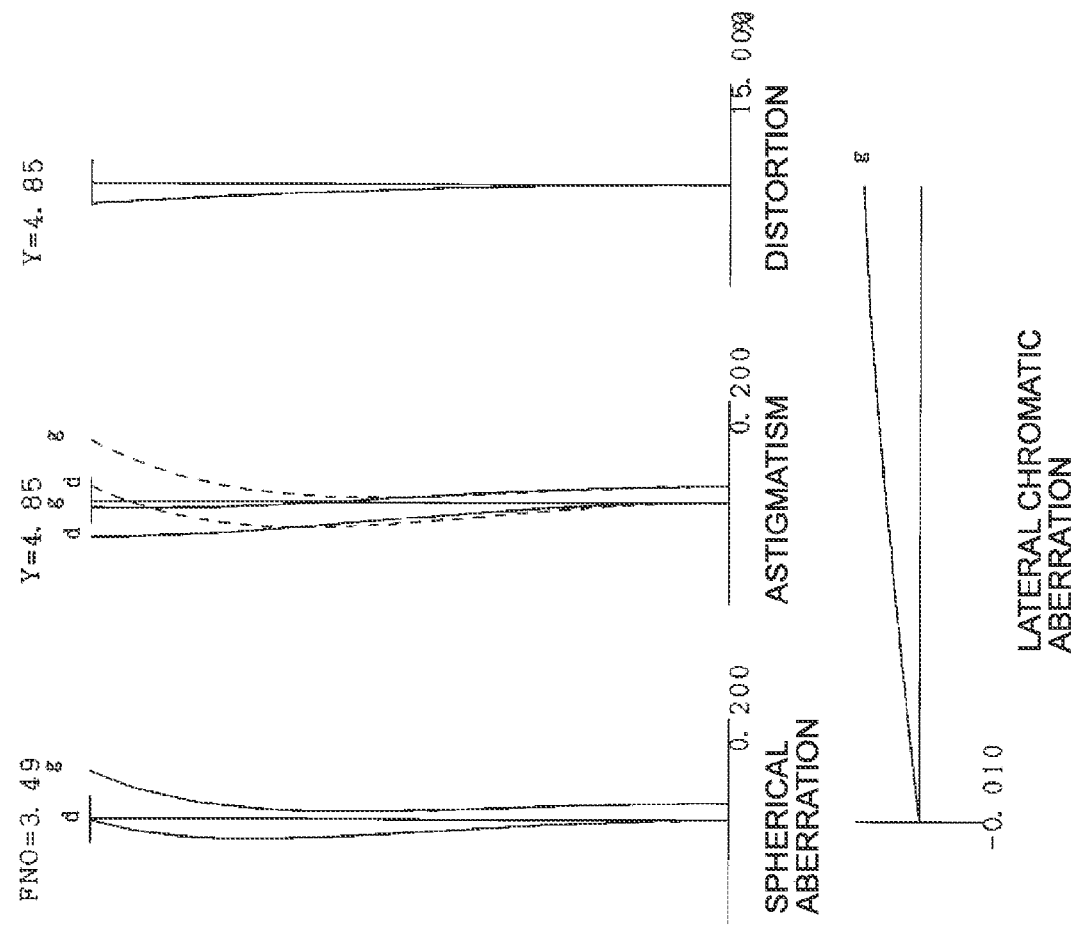

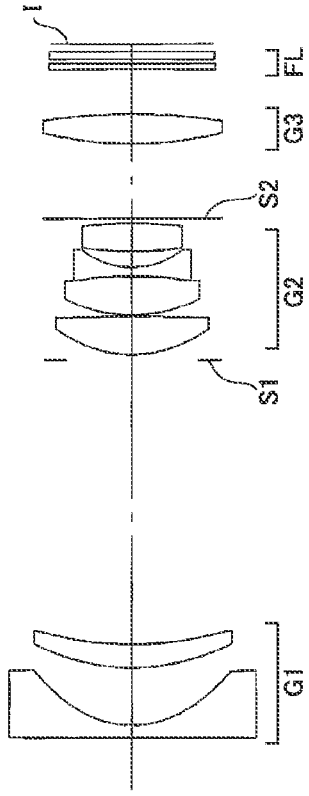
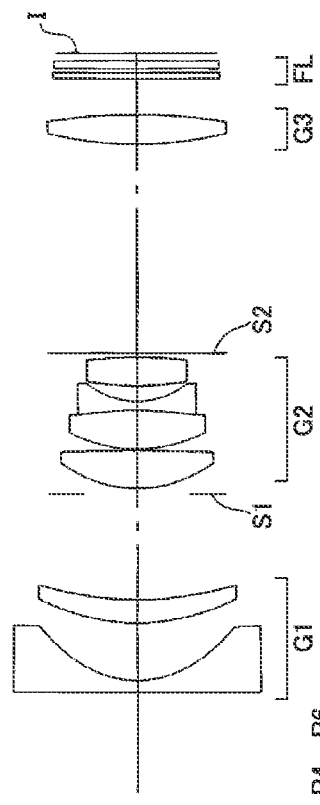
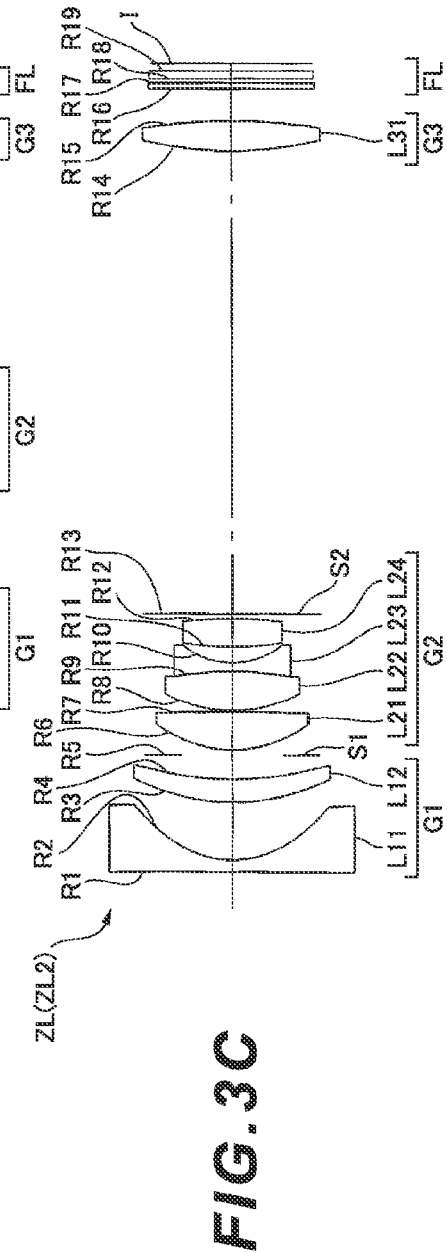
FIG. 3A
FIG. 3B
FIG. 3C

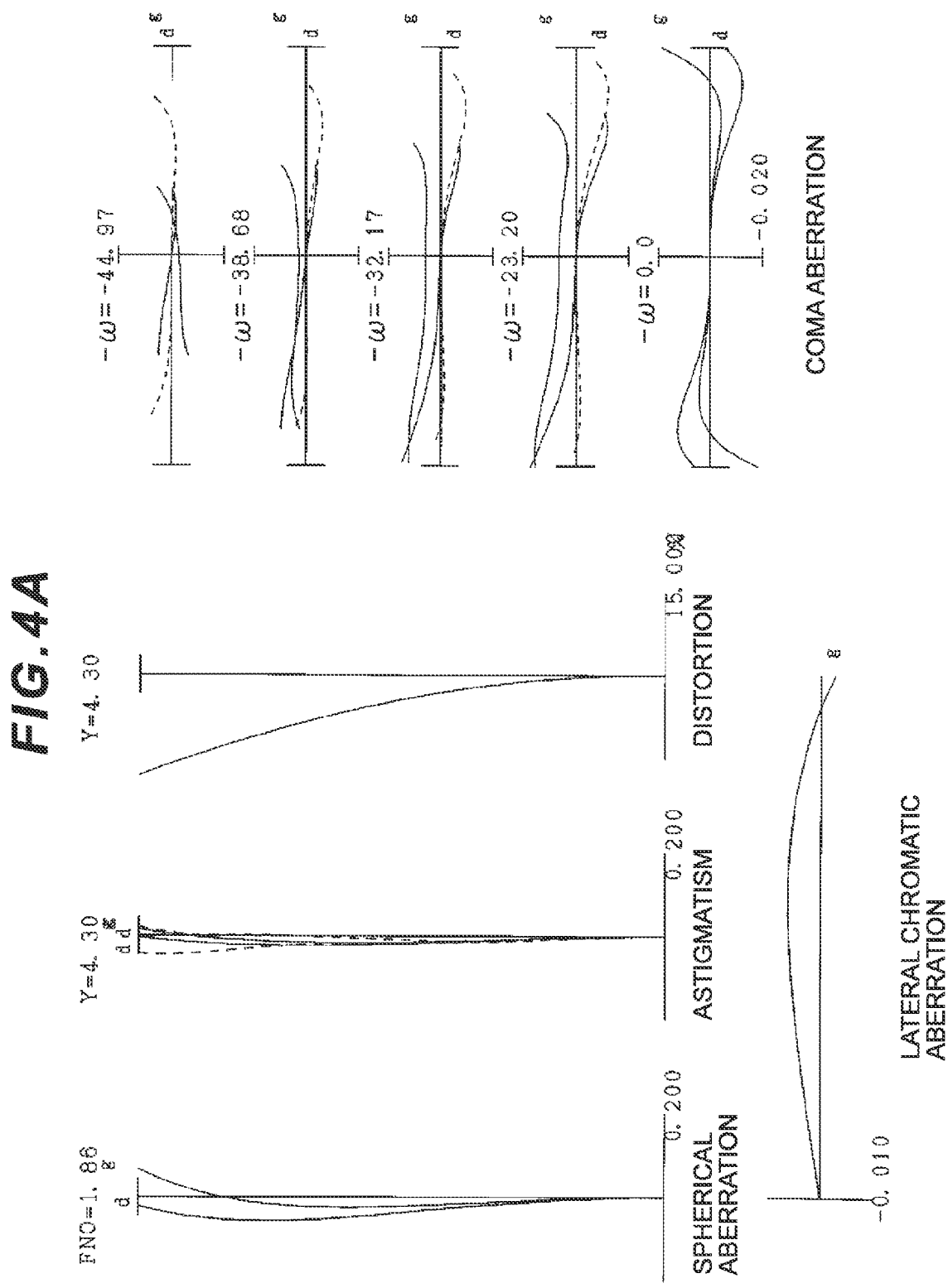

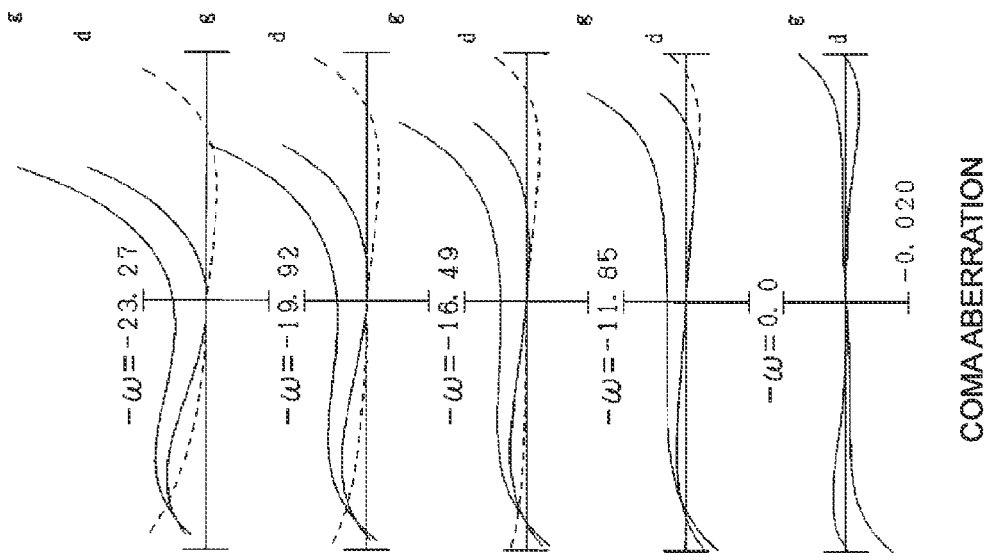
FIG. 4B
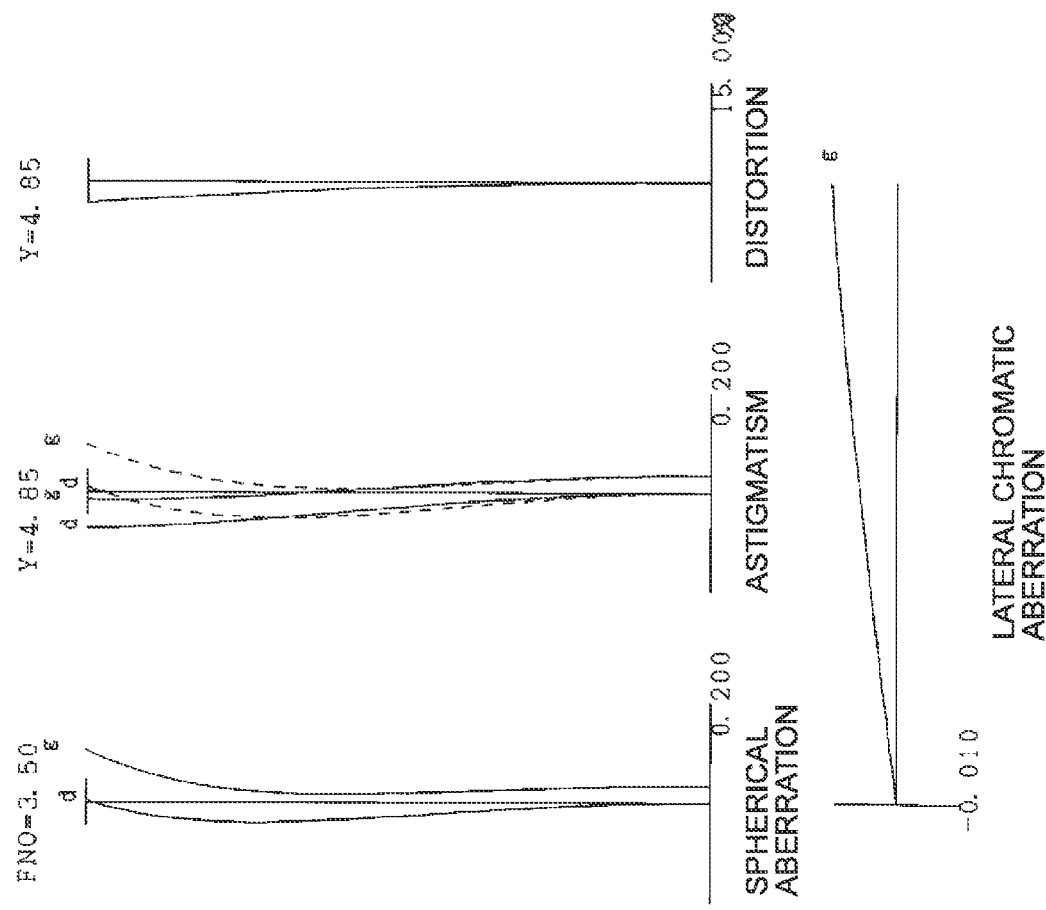

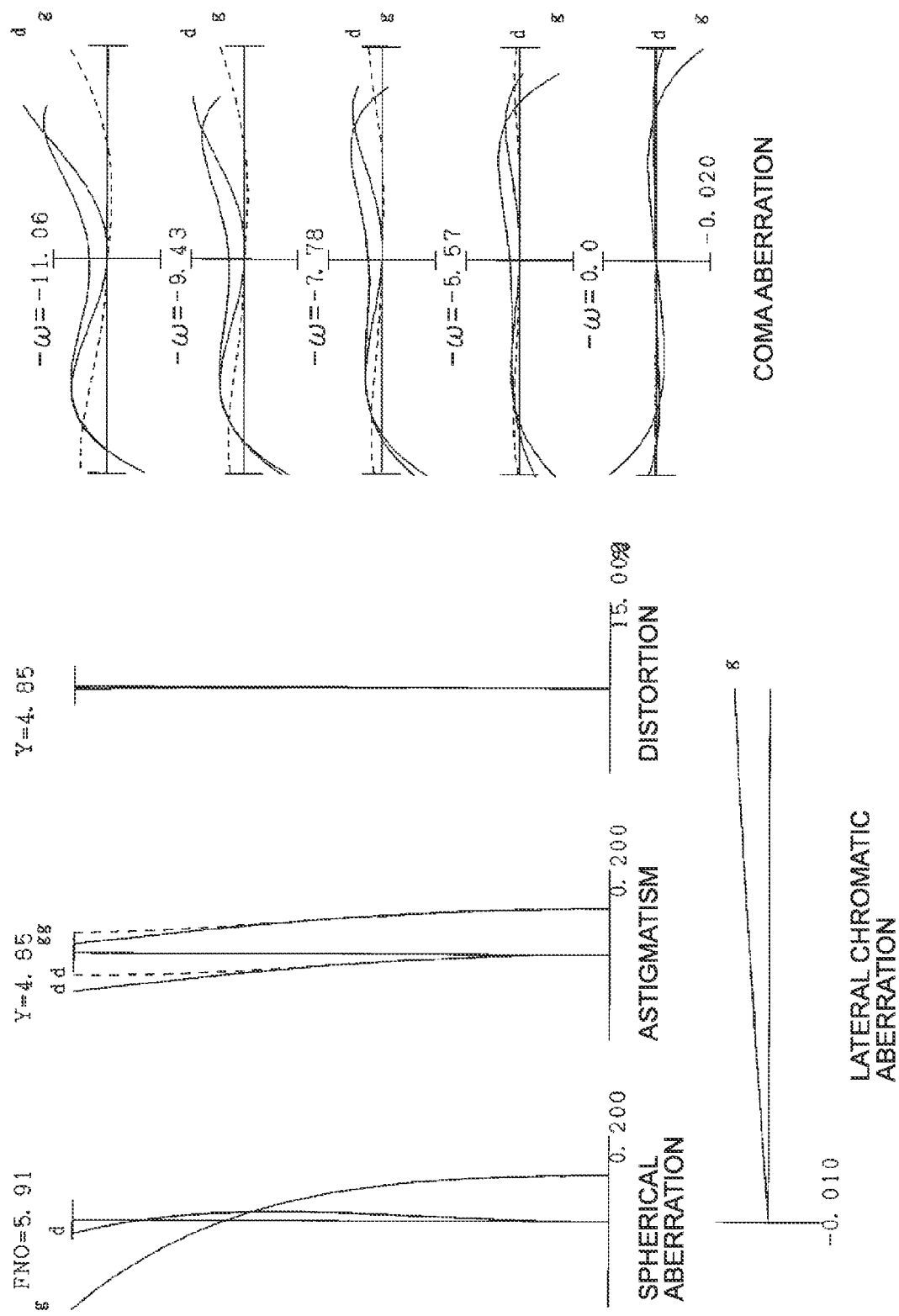

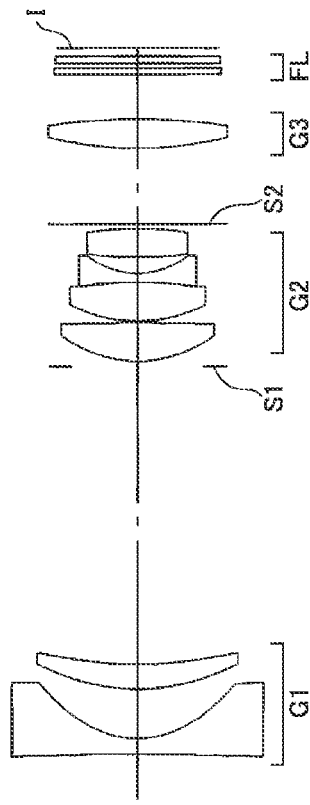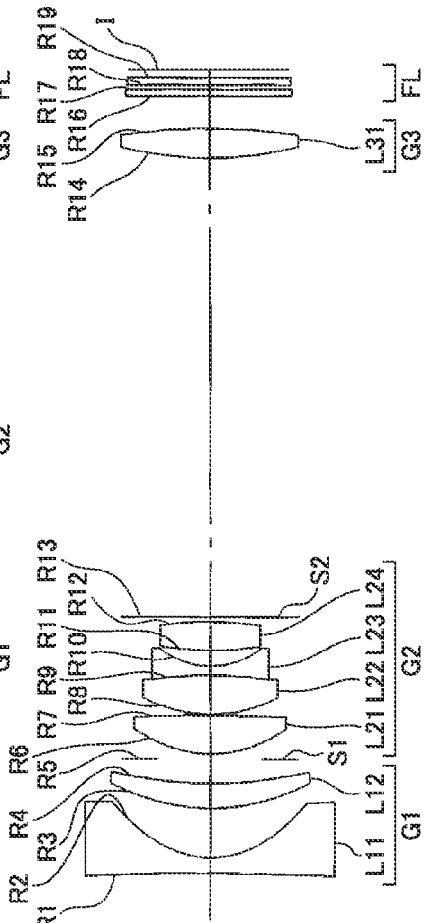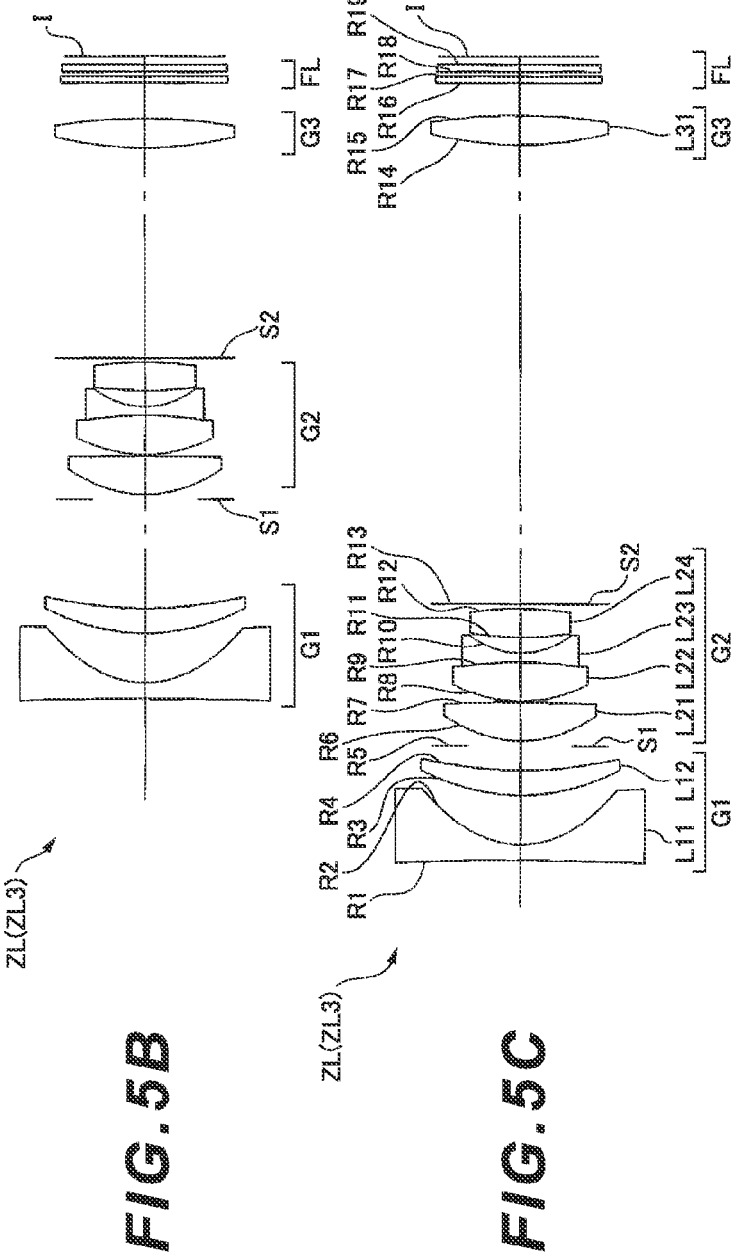
FIG.5A
FIG.5B
FIG.5C

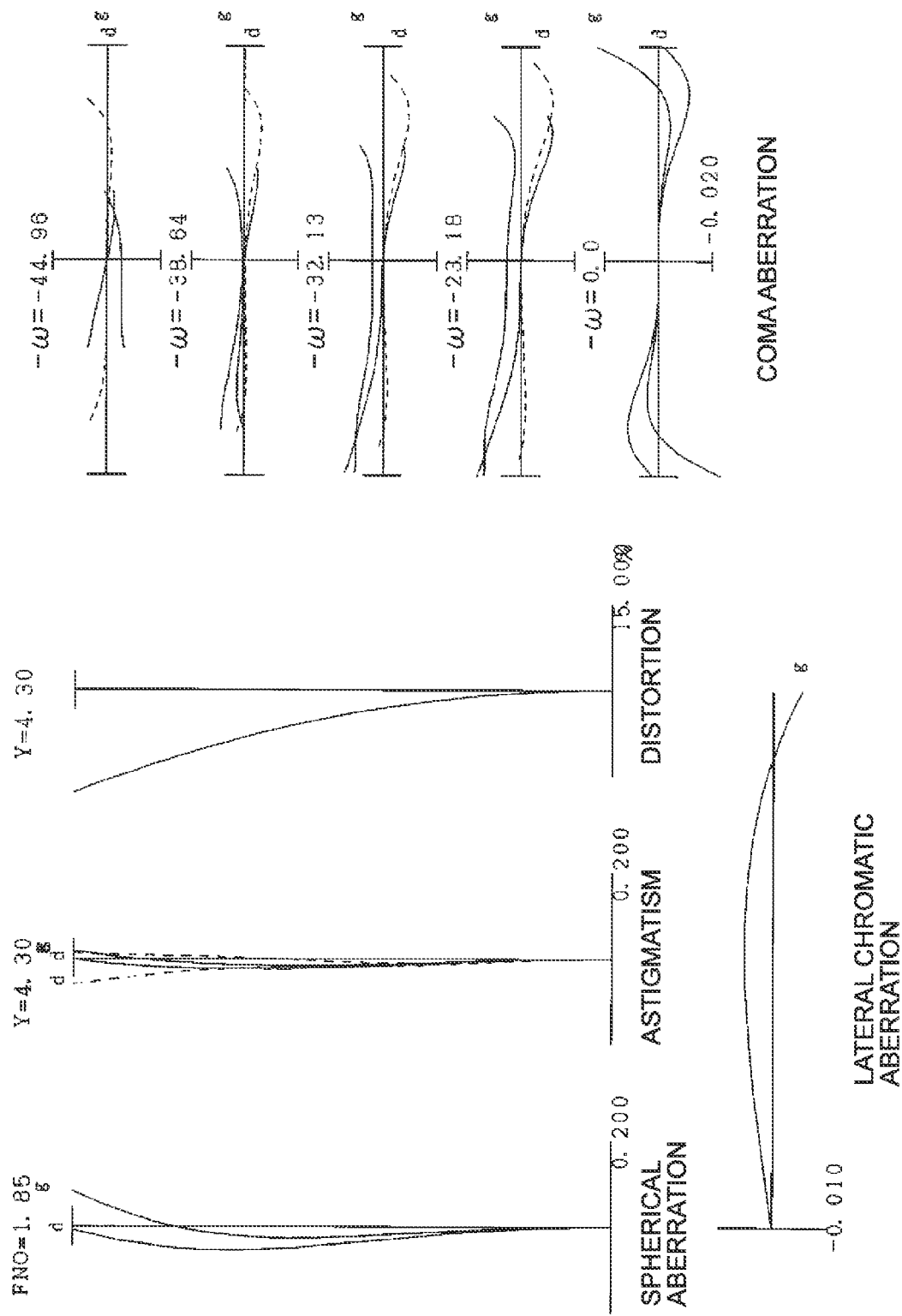

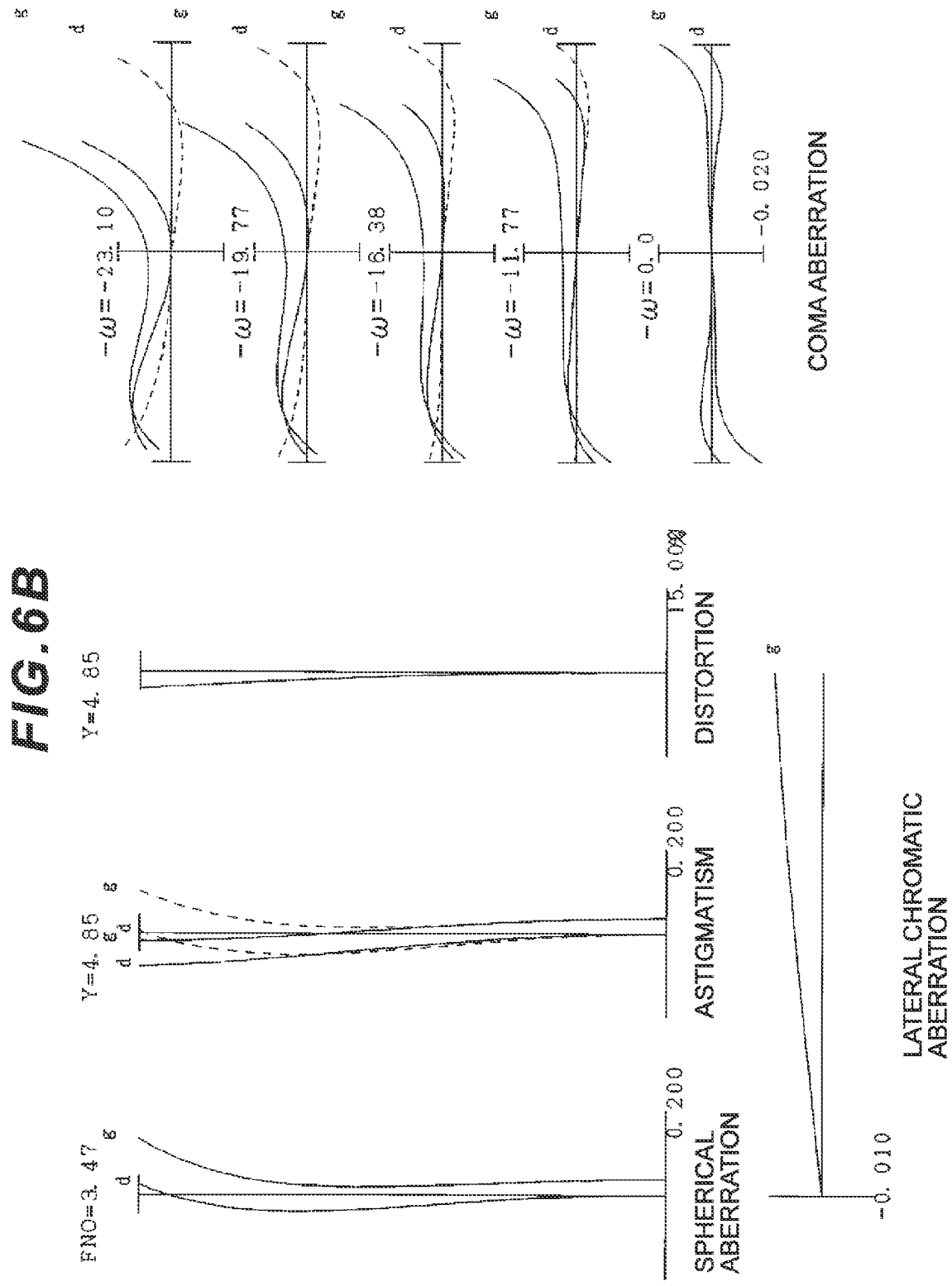

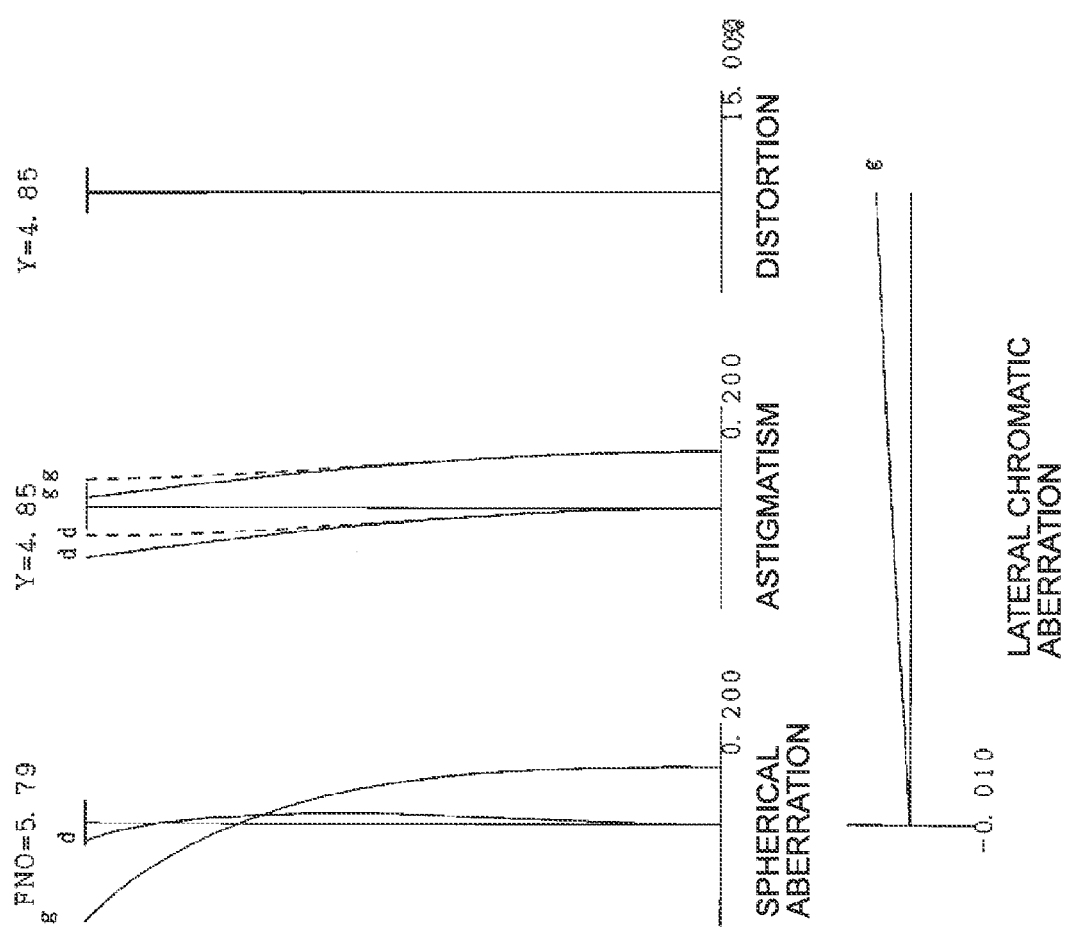

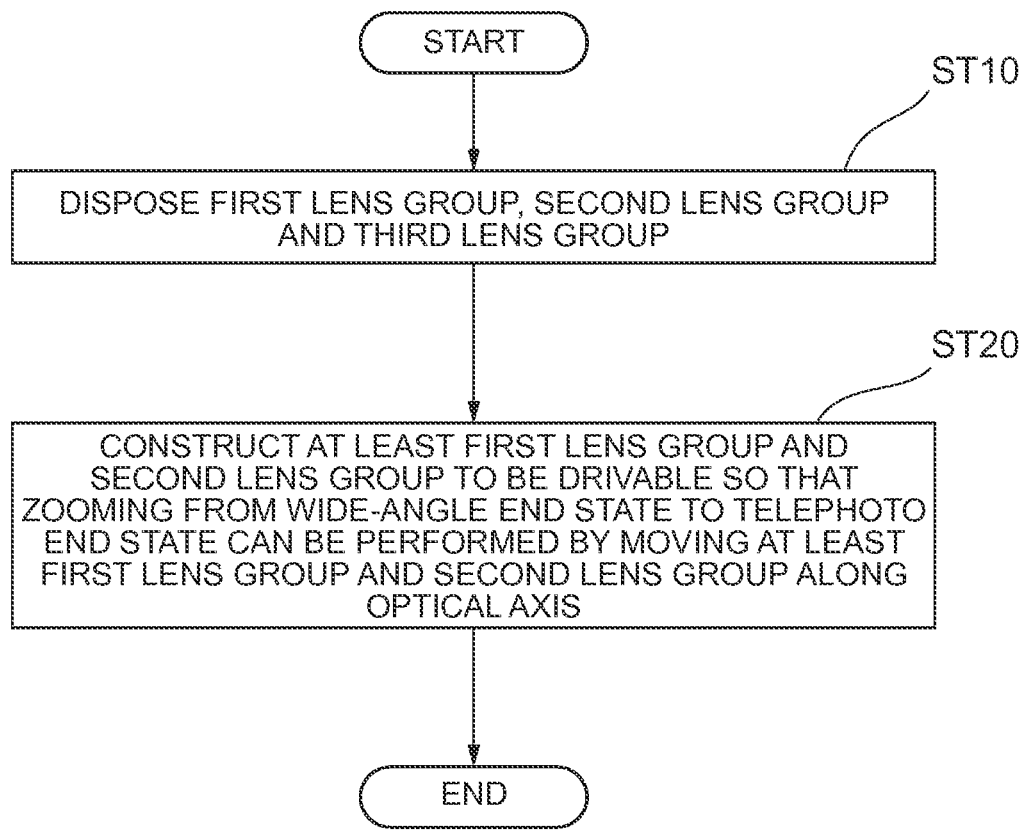

ZOOM LENS, OPTICAL APPARATUS AND MANUFACTURING METHOD FOR THE ZOOM LENS

TECHNICAL FIELD

The present invention relates to a zoom lens and an optical apparatus, which are ideal for a digital still camera or the like, and a manufacturing method for the zoom lens.

TECHNICAL BACKGROUND

In recent years, image capturing apparatuses (cameras) using solid-stage image sensors, such as digital still cameras and digital video cameras, have rapidly advanced in terms of performance and compactness. For these image capturing apparatuses, a zoom lens is normally used for the image capturing lens. If a zoom lens is used, the user can easily take a picture at an angle of view that is optimum for the image capturing conditions. For the zoom lens, a wider angle of view, a larger aperture ratio and a higher zoom ratio are strongly demanded in order to expand the image capturing area of the camera. For this, various zoom lenses, which have a wide angle of view and sufficient brightness in the wide-angle end state, and which can perform telephotography, have been proposed (e.g. see Patent Document 1).

PRIOR ARTS LIST

Patent Document

Patent Document 1: Japanese Laid-Open Patent Publication No. 2011-107312(A)

SUMMARY OF THE INVENTION

Problems to be Solved by the Invention

A conventional zoom lens, however, does not satisfy an ideal optical performance.

With the foregoing in view, it is an object of the present invention to provide a zoom lens and an optical apparatus having an ideal optical performance, with a wide-angle of view, a large aperture ratio and a high zoom ratio, and a manufacturing method for the zoom lens.

Means to Solve the Problems

To achieve this object, a zoom lens according to the present invention is a zoom lens constituted by, in order from an object along an optical axis: a first lens group having negative refractive power; a second lens group having positive refractive power; and a third lens group having positive refractive power. At least the first lens group and the second lens group are moved along the optical axis upon zooming from a wide-angle end state to a telephoto end state, so that a distance between the first lens group and the second lens group decreases, and a distance between the second lens group and the third lens group increases, the first lens group includes one positive lens, the second lens group includes at least one negative lens, and the following conditional expressions are satisfied:

$$2.00 < Nd1 < 2.50$$

$$2.00 < Nd2 < 2.50$$

$$16.0 < vd1 < 20.0$$

where Nd1 denotes a refractive index of the positive lens of the first lens group at d-line, Nd2 denotes a refractive index of at least one negative lens of the second lens group at d-line, and vd1 denotes an Abbe number of the positive lens of the first lens group at d-line.

In this zoom lens, it is preferable that a variable diaphragm to determine an F number is disposed near the object side of the second lens group.

In this zoom lens, it is preferable that the second lens group includes one negative lens as the at least one negative lens.

In this zoom lens, it is preferable that the following conditional expression is satisfied:

$$3.20 < Nd2 + (0.05 \times vd2) < 3.70$$

where vd2 denotes an Abbe number of at least one negative lens of the second lens group at d-line.

In this zoom lens, it is preferable that the second lens group includes a positive lens disposed in a position closest to the object in the second lens group, and the object side lens surface of the positive lens disposed in the position closest to the object in the second lens group is aspherical.

In this zoom lens, it is preferable that the second lens group includes a positive lens disposed in a position closest to the object in the second lens group, and the object side lens surface of the positive lens disposed in the position closest to the object in the second lens group is an aspherical surface of which radius of curvature increases in a direction from the optical axis to the periphery of the lens.

In this zoom lens, it is preferable that the second lens group includes a positive lens disposed in a position closest to the object in the second lens group, and the object side lens surface of the positive lens disposed in the position closest to the object in the second lens group is an aspherical surface of which radius of curvature increases in a direction from the optical axis to the periphery of the lens, and the following conditional expression is satisfied:

$$0.018 < X \times Y\max/(fw \times TLw) < 0.040$$

where X denotes the maximum sag in an effective diameter of the object side lens surface of the positive lens disposed in the position closest to the object in the second lens group, Ymax denotes the maximum image height of the zoom lens in the wide-angle end state, fw denotes a focal length of the zoom lens in the wide-angle end state; and TLw denotes a total length of the zoom lens in the wide-angle end state.

In this zoom lens, it is preferable that the second lens group includes a positive lens disposed in a position closest to the object in the second lens group, and the following conditional expression is satisfied:

$$0.60 < f2F/f2 < 1.10$$

where f2F denotes a focal length of the positive lens disposed in the position closest to the object in the second lens group, and f2 denotes a focal length of the second lens group.

In this zoom lens, it is preferable that the second lens group includes a positive lens disposed in a position closest to the object in the second lens group, and the following conditional expressions are satisfied:

$$2.60 < Nd2F + (0.02 \times vd2F) < 3.00$$

$$1.65 < Nd2F < 1.85$$

where Nd2F denotes a refractive index of the positive lens disposed in the position closest to the object in the second lens group at d-line, and vd2F denotes an Abbe number of the positive lens disposed in the position closest to the object in the second lens group at d-line.

In this zoom lens, it is preferable that the following conditional expression is satisfied:

$$1.80 < ft/(-f1) < 2.40$$

where ft denotes a focal length of the zoom lens in the telephoto end state, and f1 denotes a focal length of the first lens group.

In this zoom lens, it is preferable that the following conditional expression is satisfied:

$$0.95 < f2/(fw \times ft)^{1/2} < 1.25$$

where f2 denotes a focal length of the second lens group, fw denotes a focal length of the zoom lens in the wide-angle end state, and ft denotes a focal length of the zoom lens in the telephoto end state.

In this zoom lens, it is preferable that the first lens group is constituted by, in order from the object along the optical axis, one negative lens and one positive lens.

In this zoom lens, it is preferable that a lens disposed in a position closest to the object in the first lens group has an aspherical surface.

In this zoom lens, it is preferable that a lens disposed in a position closest to an image in the first lens group has an aspherical surface.

In this zoom lens, it is preferable that the second lens group includes, in order from the object along the optical axis, a first positive lens, a second positive lens and a negative lens.

In this zoom lens, it is preferable that the second lens group includes, in order from the object along the optical axis, a first positive lens, a second positive lens, a negative lens and a third positive lens.

In this zoom lens, it is preferable that the second lens group includes, in order from an image along the optical axis, a positive lens and a negative lens.

An optical apparatus according to the present invention is an optical apparatus having a zoom lens that forms an image of an object on a predetermined surface, and uses the zoom lens according to the present invention for the zoom lens.

A manufacturing method for a zoom lens according to the present invention includes: disposing, in order from an object along an optical axis, a first lens group having negative refractive power, a second lens group having positive refractive power, and a third lens group having positive refractive power; moving at least the first lens group and the second lens group along the optical axis upon zooming from a wide-angle end state to a telephoto end state, so that a distance between the first lens group and the second lens group decreases, and a distance between the second lens group and the third lens group increases; disposing one positive lens as the first lens group; disposing at least one negative lens as the second lens group; and allowing the following conditional expressions to be satisfied:

$$2.00 < Nd1 < 2.50$$

$$2.00 < Nd2 < 2.50$$

$$16.0 < vd1 < 20.0$$

where Nd1 denotes a refractive index of the positive lens of the first lens group at d-line, Nd2 denotes a refractive index of at least one negative lens of the second lens group at d-line, and vd1 denotes an Abbe number of the positive lens of the first lens group at d-line.

In this manufacturing method for the zoom lens, it is preferable that the following conditional expression is satisfied:

$$3.20 < Nd2 + (0.05 \times vd2) < 3.70$$

where vd2 denotes an Abbe number of at least one negative lens of the second lens group at d-line.

In this manufacturing method for the zoom lens, it is preferable that a positive lens is disposed in a position closest to the object in the second lens group, and the following conditional expression is satisfied:

$$0.60 < f2F/f2 < 1.10$$

where f2F denotes a focal length of the positive lens disposed in the position closest to the object in the second lens group, and f2 denotes a focal length of the second lens group.

In this manufacturing method for the zoom lens, it is preferable that the following conditional expression is satisfied:

$$1.80 < ft/(-f1) < 2.40$$

where ft denotes a focal length of the zoom lens in the telephoto end state, and f1 denotes a focal length of the first lens group.

In this manufacturing method for the zoom lens, it is preferable that the following conditional expression is satisfied:

$$0.95 < f2/(fw \times ft)^{1/2} < 1.25$$

where f2 denotes a focal length of the second lens group, fw denotes a focal length of the zoom lens in the wide-angle end state, and ft denotes a focal length of the zoom lens in the telephoto end state.

Advantageous Effects of the Invention

According to the present invention, an ideal optical performance can be implemented with a wide-angle of view, a large aperture and a high zoom ratio.

BRIEF DESCRIPTION OF THE DRAWINGS

FIG. 1A shows a lens configuration of a zoom lens according to Example 1 in a wide-angle end state, FIG. 1B shows the lens configuration in an intermediate focal length state, and FIG. 1C shows the lens configuration in a telephoto end state;

FIG. 2A is a set of graphs showing various aberrations of the zoom lens according to Example 1 upon focusing on infinity in the wide-angle end state, FIG. 2B is a set of graphs showing various aberrations of the zoom lens upon focusing on infinity in the intermediate focal length state.

FIG. 3A shows a lens configuration of a zoom lens according to Example 2 in a wide-angle end state, FIG. 3B shows the lens configuration in an intermediate focal length state, and FIG. 3C shows the lens configuration in a telephoto end state;

FIG. 4A is a set of graphs showing various aberrations of the zoom lens according to Example 2 upon focusing on infinity in the wide-angle end state, FIG. 4B is a set of graphs showing various Aberrations of the zoom lens upon focusing on infinity in the intermediate focal length state, and FIG. 4C is a set of graphs showing various aberrations of the zoom lens upon focusing on infinity in the telephoto end state;

FIG. 5A shows a lens configuration of a zoom lens according to Example 3 in a wide-angle end state, FIG. 5B shows the lens configuration in an intermediate focal length state, and FIG. 5C shows the lens configuration in a telephoto end state;

FIG. 6A is a set of graphs showing various aberrations of the zoom lens according to Example 3 upon focusing on infinity in the wide-angle end state, FIG. 6B is a set of graphs showing various Aberrations of the zoom lens upon focusing on infinity in the intermediate focal length state, and FIG. 6C is a set of graphs showing various aberrations of the zoom lens upon focusing on infinity in the telephoto end state;

FIG. 9 is a flow chart depicting a manufacturing method for the zoom lens.

DESCRIPTION OF THE EMBODIMENTS

Figure 7A:
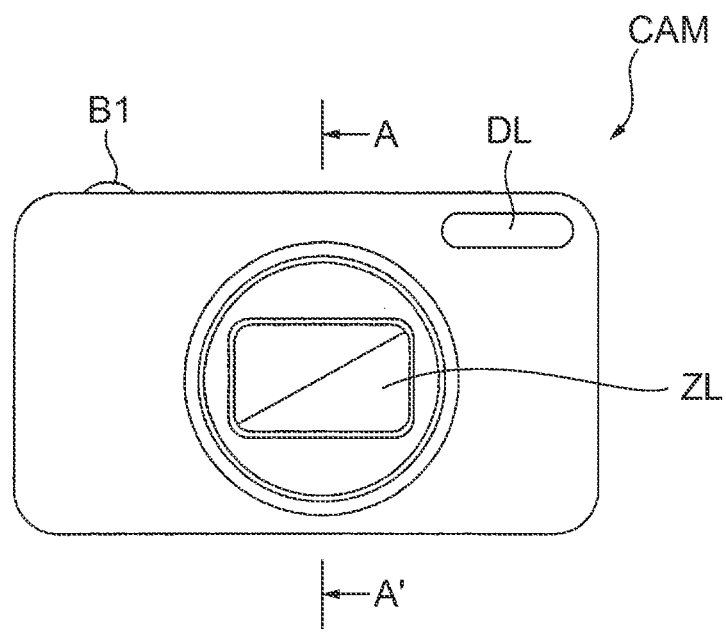
FIG. 7A is a front view of a digital still camera.
Figure 7B:
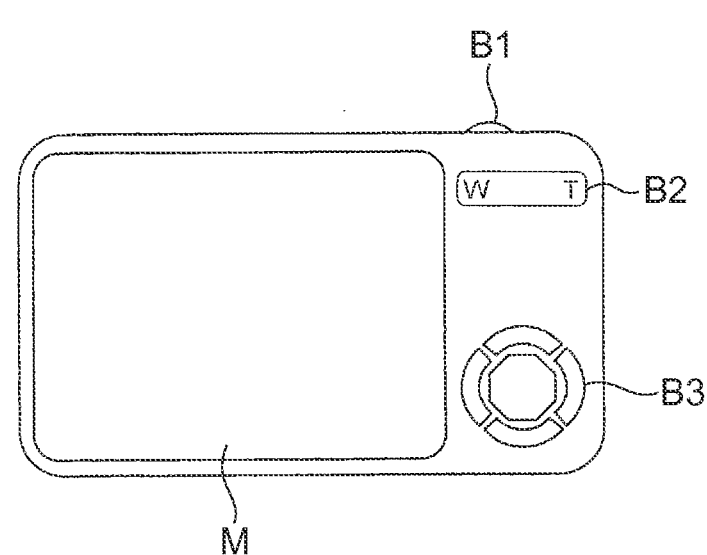
FIG. 7B is a rear view of the digital still camera.
Figure 8:
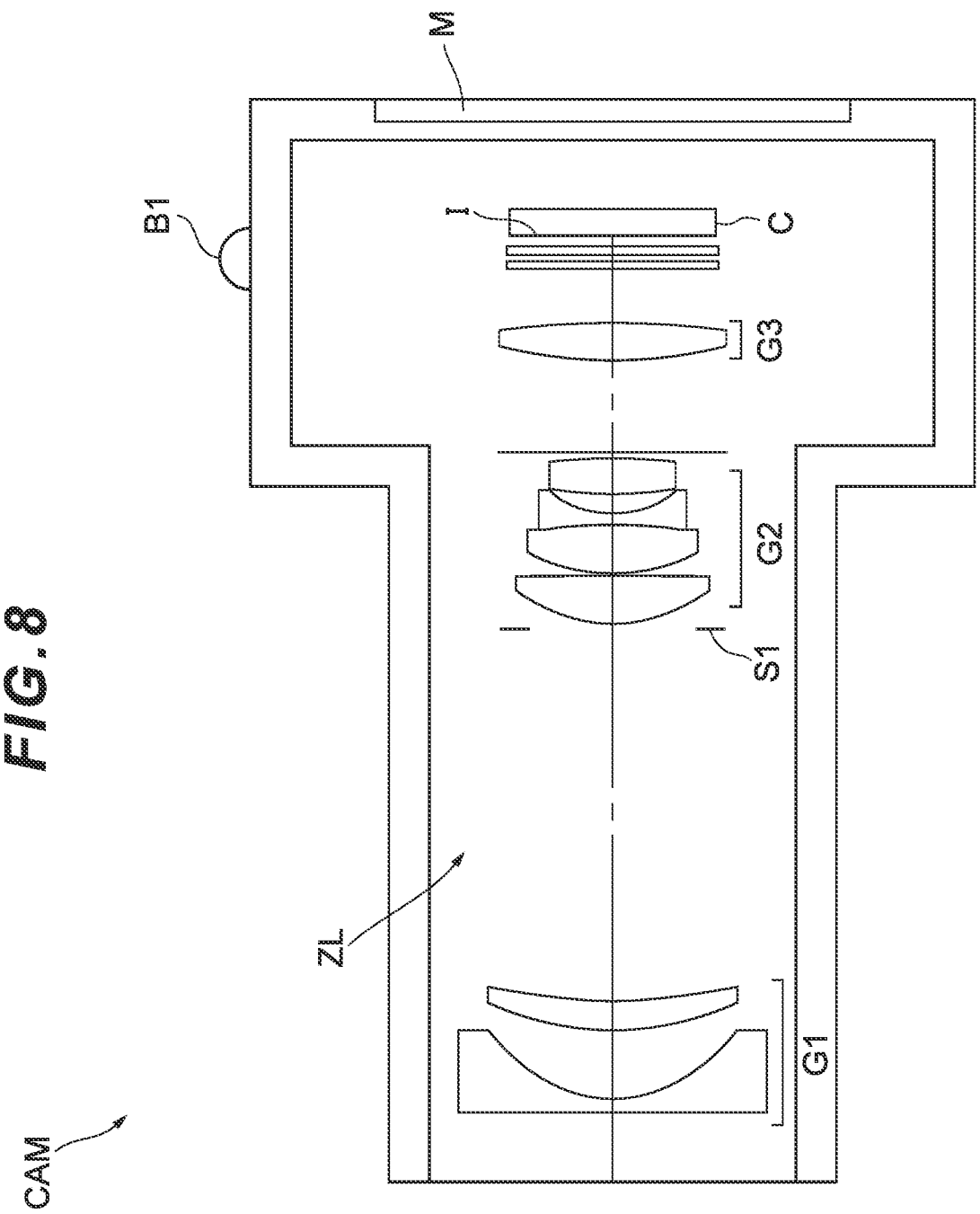
FIG. 8 is a cross-sectional view along the line indicated by arrow marks A-A' in FIG. 7A.

Embodiments of the present invention will now be described with reference to the drawings. FIG. 7 and FIG. 8 show a digital still camera CAM which includes the zoom lens according to the present invention. FIG. 7A shows a front view of the digital still camera CAM, and FIG. 7B shows a rear view of the digital still camera CAM. FIG. 8 is a cross-sectional view along the line indicated by arrow marks A-A' in FIG. 7A.

If a power button (not illustrated) is pressed on the digital still camera CAM shown in FIG. 7, a shutter (not illustrated) of an image capturing lens (ZL) is released, and light from an object is collected by the image capturing lens (ZL), and forms an image on a picture element C (e.g. CCD, CMOS) which is disposed on the image plane I shown in FIG. 8. The object image formed on the picture element C is displayed on a liquid crystal monitor M disposed on the back of the digital still camera CAM. The user determines the composition of the object image while viewing the liquid crystal monitor M, then presses a release button B1 to capture the object image by the picture element, and stores it in memory (not illustrated).

The image capturing lens is constituted by a later mentioned zoom lens ZL according to the embodiments described later. The digital still camera CAM has an auxiliary light emitting unit DL, which emits auxiliary light when the object is dark, a wide (W)-tele(T) button B2 for zooming the image capturing lens (zoom lens ZL) from a wide-angle end state (W) to a telephoto end state (T), and a function button B3, which is used for setting various conditions or the like for the digital still camera CAM.

The zoom lens ZL is, for example, a negative-lead type zoom lens constituted by, in order from an object along an optical axis, a first lens group G1 having negative refractive power as a whole, a second lens group G2 having positive refractive power as a whole, and a third lens group G3 having positive refractive power as a whole, as shown in FIG. 1. The second lens group G2 is a zoom unit and a master lens group, and the first lens group G1 is a compensator group. The third lens group G3 optimizes an exit pupil position of the zoom lens system with respect to the picture element, and corrects residual aberrations which the first lens group G1 and the second lens group G2 were unable to correct. Upon zooming from a wide-angle end state to a telephoto end state, at least the first lens group G1 and the second lens group G2 move along the optical axis, so that the distance between the first lens group G1 and the second lens group G2 decreases, and the distance between the second lens group G2 and the third lens group G3 increases.

It is preferable that a variable diaphragm (iris diaphragm) S1, for determining an F number, is disposed near the object side of the second lens group G2. By disposing the variable diaphragm near the object side of the second lens group G2, the entrance pupil position moves toward the object, and the front lens diameter of the lens can be decreased.

It is preferable that the first lens group G1 includes one positive lens. The first lens group G1 has negative refractive power as a whole, but if one positive lens is disposed in the first lens group G1, aberrations in the first lens group G1 can be corrected well.

It is preferable that the second lens group G2 includes at least one negative lens. The second lens group G2 has positive refractive power as a whole, but if at least one negative lens is disposed in the second lens group G2, aberrations in the second lens group G2 can be corrected well.

In order to implement good aberration correction along with a wider angle of view, a larger aperture ratio and a higher zoom ratio of the zoom lens in the zoom lens ZL having this configuration, it is preferable that the following conditional expression (1) is satisfied:

$$2.00 < Nd1 < 2.50 \quad (1)$$

where Nd1 denotes a refractive index of the positive lens of the first lens group G1 at d-line.

The conditional expression (1) is for ideally correcting spherical aberration which is generated in the first lens group G1. If the lower limit of the conditional expression (1) is not reached, it becomes difficult to correct spherical aberration in the telephoto end state, which is not desirable. If the upper limit value of the conditional expression (1) is exceeded, the Petzval sum becomes too small, and astigmatic difference and curvature of field can no longer be corrected simultaneously, which is not desirable.

To demonstrate the effect of this embodiment well, it is preferable that the lower limit value of the conditional expression (1) is 2.05. To demonstrate the effect of this embodiment even more so, it is preferable that the lower limit value of the conditional expression (1) is 2.10. To demonstrate the effect of this embodiment well, it is preferable that the upper limit value of the conditional expression (1) is 2.40. To demonstrate the effect of this embodiment even more so, it is preferable that the upper limit value of the conditional expression (1) is 2.30.

In this case, it is preferable that the following conditional expression (2) is satisfied:

$$2.00 < Nd2 < 2.50 \quad (2)$$

where Nd2 denotes a refractive index of at least one negative lens of the second lens group G2 at d-line.

The conditional expression (2) is for ideally correcting spherical aberration, coma aberration and curvature of field, which are generated in the second lens group G2. If the lower limit of the conditional expression (2) is not reached, spherical aberration, coma aberration and curvature of field increase, which is not desirable. If the upper limit value of the conditional expression (2) is exceeded, the Petzval sum becomes too large, and astigmatic difference and curvature of field can no longer be corrected simultaneously, which is not desirable.

To demonstrate the effect of this embodiment well, it is preferable that the lower limit value of the conditional expression (2) is 2.05. To demonstrate the effect of this embodiment even more so, it is preferable that the lower limit value of the conditional expression (2) is 2.10. To demonstrate the effect of this embodiment well, it is preferable that the upper limit value of the conditional expression (2) is 2.40. To demonstrate the effect of this embodiment even more so, it is preferable that the upper limit value of the conditional expression (2) is 2.30.

In this case, it is also preferable that the following conditional expression (3) is satisfied:

$$16.0<vd1<20.0 \quad (3)$$

where vd1 denotes an Abbe number of the positive lens of the first lens group G1 at d-line.

The conditional expression (3) is for ideally correcting Chromatic aberration of the first lens group G1. If the upper limit value of the conditional expression (3) is exceeded, correction of chromatic aberration tends to be insufficient. If this is forcibly corrected, the refractive power of the positive lens included in the first lens group G1 becomes too strong, and correction of lateral Chromatic aberration in the wide-angle end state becomes difficult, which is not desirable. If the lower limit value of the conditional expression (3) is not reached, correcting chromatic aberration becomes excessive, which is not desirable.

To demonstrate the effect of this embodiment well, it is preferable that the lower limit value of the conditional expression (3) is 17.0. To demonstrate the effect of this embodiment even more so, it is preferable that the lower limit value of the conditional expression (3) is 17.5. To demonstrate the effect of this embodiment well, it is preferable that the upper limit value of the conditional expression (3) is 19.5.

In the zoom lens ZL having this configuration, it is preferable that the second lens group G2 includes one negative lens as "at least one negative lens" mentioned above. This configuration makes assembly and adjustment easier, and prevents deterioration of optical performance caused by assembly and adjustment errors, which is desirable.

In the zoom lens ZL having this configuration, it is preferable that the following conditional expression (4) is satisfied:

$$3.20<Nd2+(0.05\times vd2)<3.70 \quad (4)$$

where vd2 denotes an Abbe number of at least one negative lens of the second lens group G2 at d-line.

The conditional expression (4) is for correcting longitudinal chromatic aberration and curvature of field with good balance. If the upper limit value of the conditional expression (4) is exceeded, correction of curvature of field in a wide-angle end state becomes difficult, which is not desirable. If the lower limit value of the conditional expression (4) is not reached, correction of longitudinal chromatic aberration in a telephoto end state becomes difficult, which is not desirable.

To demonstrate the effect of this embodiment well, it is preferable that the lower limit value of the conditional expression (4) is 3.3. To demonstrate the effect of this embodiment even more so, it is preferable that the lower limit value of the conditional expression (4) is 3.4. To demonstrate the effect of this embodiment well, it is preferable that the upper limit value of the conditional expression (4) is 3.6. To demonstrate the effect of this embodiment even more so, it is preferable that the upper limit value of the conditional expression (4) is 3.5.

In the zoom lens ZL having this configuration, it is preferable that the second lens group G2 includes a positive lens disposed in a position closest to the object in the second lens group G2, and the object side lens surface of the positive lens disposed in the position closest to the second lens group G2 is aspherical. By this configuration, spherical aberration can be corrected well.

It is preferable that the object side lens surface of the positive lens disposed in the position closest to the object in the second lens group G2 is an aspherical surface of which radius of curvature increases in a direction from the optical axis to the periphery of the lens. By this configuration, spherical aberration can be corrected even better.

In this case, it is preferable that the following expression (5) is satisfied:

$$0.018<X\times Ymax/(fw\times TLw)<0.040 \quad (5)$$

where X denotes the maximum sag in an effective diameter of the object side lens surface of the positive lens disposed in the position closest to the object in the second lens group G2, Ymax denotes the maximum image height of the zoom lens ZL in a wide-angle end state, fw denotes a focal length of the zoom lens ZL in the wide-angle end state, and TLw denotes a total length of the zoom lens ZL in the wide-angle end state.

The conditional expression (5) is for ideally correcting spherical aberration that increases as the aperture ratio of the optical system increases. In this embodiment, the zoom lens is constituted by at least three lens groups (negative, positive, positive) in order from the object along the optical axis. According to this configuration, the luminous flux diverged in the first lens group G1 enters the second lens group G2, hence correction of spherical aberration normally becomes difficult. Therefore as mentioned above, the positive lens to converge the luminous flux diverged by the first lens group G1 is disposed in a position closest to the object in the second lens group G2, and the object side lens surface of the positive lens is formed as an aspherical surface of which radius of curvature increases in the direction toward the periphery of the lens, whereby the spherical aberration can be effectively corrected.

The conditional expression (5) is also for specifying an appropriate range of the sag of this aspherical lens. If the upper limit value of the conditional expression (5) is exceeded, correction of aspherical aberration in a wide-angle end state is difficult, which is not desirable. If the lower limit value of the conditional expression (5) is not reached, correction of spherical aberration and coma aberration is difficult when the aperture ratio of the lens is increased, which is not desirable.

To demonstrate the effect of this embodiment well, it is preferable that the lower limit value of the conditional expression (5) is 0.020. To demonstrate the effect of this embodiment even more so, it is preferable that the lower limit value of the conditional expression (5) is 0.022. To demonstrate the effect of this embodiment well, it is preferable that the upper limit value of the conditional expression (5) is 0.036. To demonstrate the effect of this embodiment even more so, it is preferable that the upper limit value of the conditional expression (5) is 0.032.

In the zoom lens ZL having this configuration, it is preferable that the second lens group G2 includes a positive lens disposed in a position closest to the object in the second lens group G2, and the following conditional expression (6) is satisfied:

$$0.60<f2F/f2<1.10 \quad (6)$$

where f2F denotes a focal length of the positive lens disposed in the position closest to the object in the second lens group G2, and f2 denotes a focal length of the second lens group G2.

The conditional expression (6) is for ideally correcting spherical aberration that increases as the aperture ratio of the optical system increases, just like conditional expression (5). As mentioned above, in order to prevent excessive spherical aberration in the second lens group G2, to which the luminous flux diverged in the first lens group G1 enters, it is necessary to provide an appropriate refractive power to the positive lens disposed in the position closest to the object in the second lens group G2, so that the diverged luminous flux is converged.

If the upper limit value of the conditional expression (6) is exceeded, the refractive power of the positive lens disposed in the position closest to the object in the second lens group G2 is too weak, hence the luminous flux diverged in the first lens group G1 cannot be converged sufficiently. As a result, spherical aberration that is generated in subsequent lenses of this positive lens in the second lens group G2 increases, which is not desirable. If the lower limit value of the conditional expression (6) is not reached, the refractive power of the positive lens disposed in the position closest to the second lens group G2 is too high, and spherical aberration generated in this positive lens itself increases. Performance also drops due to decentering during manufacture, which is not desirable.

To demonstrate the effect of this embodiment well, it is preferable that the lower limit value of the conditional expression (6) is 0.65. To demonstrate the effect of this embodiment even more so, it is preferable that the lower limit value of the conditional expression (6) is 0.70. To demonstrate the effect of this embodiment well, it is preferable that the upper limit value of the conditional expression (6) is 1.00. To demonstrate the effect of this embodiment even more so, it is preferable that the conditional expression (6) is 0.90.

In the zoom lens ZL having this configuration, it is preferable that the second lens group G2 includes a positive lens disposed in a position closest to the object in the second lens group G2, and the following conditional expression (7) is satisfied:

$$2.60 < Nd2F + (0.02 \times vd2F) < 3.00 \qquad (7)$$

where Nd2F denotes the refractive index of the positive lens disposed in the position closest to the object in the second lens group G2 at d-line, and vd2F denotes an Abbe number of the positive lens disposed in the position closest to the object in the second lens group G2 at d-line.

The conditional expression (7) is for ideally correcting longitudinal chromatic aberration. If the upper limit value of the conditional expression (7) is exceeded, correction of difference of spherical aberration depending on wavelength in a telephoto end state is difficult, which is not desirable. If the lower limit value of the conditional expression (7) is not reached, correction of longitudinal chromatic aberration becomes insufficient, which is not desirable.

To demonstrate the effect of this embodiment well, it is preferable that the lower limit value of the conditional expression (7) is 2.70. To demonstrate the effect of this embodiment even more so, it is preferable that the lower limit value of the conditional expression (7) is 2.75. To demonstrate the effect of this embodiment well, it is preferable that the upper limit value of the conditional expression (7) is 2.90. To demonstrate the effect of this embodiment even more so, it is preferable that the upper limit value of the conditional expression (7) is 2.85.

In this case, it is preferable that the following conditional expression (8) is satisfied:

$$1.65 < Nd2F < 1.85 \qquad (8)$$

where Nd2F denotes a refractive index of the positive lens disposed in the position closest to the object in the second lens group G2 at d-line.

The conditional expression (8) is for correcting a longitudinal chromatic aberration well. If the upper limit value of the conditional expression (8) is exceeded, the partial dispersion ratio of glass becomes poor, and correction of the longitudinal Chromatic aberration is difficult, which is not desirable. If the lower limit value of the conditional expression (8) is not reached, correction of spherical aberration and coma aberration is difficult, which is not desirable.

To demonstrate the effect of this embodiment well, it is preferable that the lower limit value of the conditional expression (8) is 1.68. To demonstrate the effect of this embodiment even more so, it is preferable that the lower limit value of the conditional expression (8) is 1.70. To demonstrate the effect of this embodiment well, it is preferable that the upper limit value of the conditional expression (8) is 1.80. To demonstrate the effect of this embodiment even more so, it is preferable that the upper limit value of the conditional expression (8) is 1.77.

In the zoom lens ZL having this configuration, it is preferable that the following conditional expression (9) is satisfied:

$$1.80 < ft/(-f1) < 2.40 \qquad (9)$$

where ft denotes a focal length of the zoom lens ZL in the telephoto end state, and f1 denotes a focal length of the first lens group G1.

The conditional expression (9) is for specifying an appropriate range of the focal length of the first lens group G1. If the upper limit value of the conditional expression (9) is exceeded, correction of spherical aberration in the telephoto end state is difficult, which is not desirable. If the lower limit value of the conditional expression (9) is not reached, correction of coma aberration in the wide-angle end state is difficult, which is not desirable.

To demonstrate the effect of this embodiment well, it is preferable that the lower limit value of the conditional expression (9) is 1.90. To demonstrate the effect of this embodiment even more so, it is preferable that the lower limit value of the conditional expression (9) is 1.95. To demonstrate the effect of this embodiment well, it is preferable that the upper limit value of the conditional expression (9) is 2.30. To demonstrate the effect of this embodiment even more so, it is preferable that the upper limit value of the conditional expression (9) is 2.20.

In the zoom lens ZL of this configuration, it is preferable that the following conditional expression (10) is satisfied:

$$0.95 < f2/(fw \times ft)^{1/2} < 1.25 \qquad (10)$$

where f2 denotes a focal length of the second lens group G2, fw denotes a focal length of the zoom lens ZL in the wide-angle end state, and ft denotes a focal length of the zoom lens ZL in the telephoto end state.

The conditional expression (10) is for specifying an appropriate range of the focal length of the second lens group G2. If the upper limit value of the conditional expression (10) is exceeded, correction of coma aberration in the intermediate focal length state is difficult, which is not desirable. If the lower limit value of the conditional expression (10) is not reached, correction of spherical aberration in the telephoto end state is difficult, which is not desirable.

To demonstrate the effect of this embodiment well, it is preferable that the lower limit value of the conditional expression (10) is 1.00. To demonstrate the effect of this embodiment even more so, it is preferable that the lower limit value of the conditional expression (10) is 1.05. To demonstrate the effect of this embodiment well, it is preferable that the upper limit value of the conditional expression (10) is 1.20. To demonstrate the effect of this embodiment even more so, it is preferable that the upper limit value of the conditional expression (10) is 1.15.

In the zoom lens ZL having this configuration, it is preferable that the first lens group G1 is constituted by, in order from the object along the optical axis, one negative lens and one positive lens. This is a lens configuration using the minimum number of lenses that can correct chromatic aberration, spherical aberration, coma aberration and astigmatism of the first lens group G1, and is a practical way of implementing both a smaller size and higher performance of the lenses.

In the zoom lens ZL having this configuration, it is preferable that a lens disposed in a position closest to the object in the first lens group G1 has an aspherical surface. If the lens disposed in the position closest to the object in the first lens group G1 is an aspherical lens, coma aberration and astigmatic difference in the wide-angle end state, and coma aberration in the telephoto end state can be corrected well.

In the zoom lens ZL having this configuration, it is preferable that a lens disposed in a position closest to the image in the first lens group G1 has an aspherical surface. If the lens disposed in the position closest to the image in the first lens group G1 is an aspherical lens, spherical aberration in the telephoto end state can be corrected well.

In the zoom lens ZL having this configuration, it is preferable that the second lens group G2 includes, in order from the object along the optical axis, a first positive lens, a second positive lens, and a negative lens. By this configuration, the principal point of the second lens group G2 can be moved toward the object. Then the distance between the first lens group G1 and the second lens group G2 can be ensured in the telephoto end state, and spherical aberration can be corrected well.

It is also preferable that the second lens group G2 includes, in order from the object along the optical axis, a first positive lens, a second positive lens, a negative lens, and a third positive lens. By disposing the third positive lens on the image side of the negative lens, curvature of field in the wide-angle end state can be corrected well.

In the zoom lens ZL having this configuration, it is preferable that the second lens group G2 includes, in order from the image along the optical axis, a positive lens and a negative lens. By this configuration, curvature of field in the wide-angle end state can be corrected well. Thus according to the present embodiment, a zoom lens ZL and an optical apparatus (digital still camera CAM) having compactness and ideal optical performance, with a wide-angle of view, a large aperture ratio and a high zoom ratio can be implemented.

Focusing from an object at infinity and an object at close distance (object at finite distance) can be performed by moving the first lens group G1 or the third lens group G3 toward the object. If the first lens group G1 is moved however, light quantity around the periphery of the screen tends to drop when photographing an object at close distance, hence it is preferable to move the third lens group G3 toward the object to perform focusing.

A method for manufacturing the zoom lens ZL having this configuration will now be described with reference to FIG. 9. First the first lens group G1 having negative refractive power, the second lens group G2 having positive lens power, and the third lens group G3 having positive refractive power are assembled in a cylindrical lens barrel in order from the object (step ST10). Then at least a first lens group G1 and the second lens group G2 are constructed to be drivable so that the zooming is performed from the wide-angle end state to the telephoto end state by moving at least the first lens group G1 and the second lens group G2 along the optical axis (step ST20).

In the step ST10 for assembling the lenses, one positive lens is disposed as the first lens group G1, and at least one negative lens is disposed as the second lens group G2. At this time, the first lens group G1, the second lens group G2 and the third lens group G3 are disposed so that the above mentioned predetermined conditional expressions are satisfied. According to this manufacturing method, a zoom lens ZL having compactness and ideal optical performance with the wide-angle of view, large aperture ratio and high zoom ratio can be implemented.

EXAMPLES

Example 1

Each example of the present invention will now be described with reference to the drawings. Example 1 will be described first with reference to FIG. 1, FIG. 2 and Table 1. FIG. 1A shows a lens configuration of a zoom lens ZL (ZL1) according to Example 1 in a wide-angle end state, FIG. 1B shows the lens configuration in an intermediate focal length state, and FIG. 1C shows the lens configuration in a telephoto end state. The zoom lens ZL1 according to Example 1 is constituted by, in order from the object along the optical axis: a first lens group G1 having negative refractive power as a whole; a second lens group G2 having positive refractive power as a whole; and a third lens group G3 having positive refractive power as a whole. Upon zooming from the wide-angle end state to the telephoto end state, the first lens group G1 and the second lens group G2 move along the optical axis respectively, and the third lens group G3 simply moves toward the image along the optical axis with the moving distance shorter than that of the first lens group G1 and the second lens group G2, so that the distance between the first lens group G1 and the second lens group G2 decreases, and the distance between the second lens group G2 and the third lens group G3 increases.

The first lens group G1 includes, in order from an object along an optical axis, a biconcave negative lens L11, and a positive meniscus lens L12 having a convex surface facing the object. In the first lens group G1, a lens surface facing the image plane I in the negative lens L11 and the lens surfaces on both sides of the positive lens L12 are aspherical. The second lens group G2 includes, in order from the object along the optical axis, a first biconvex positive lens L21, a second biconvex positive lens L22, a biconcave negative lens L23 and a third biconvex positive lens L24. In the second lens group G2, the lens surfaces on both sides of the first positive lens L21 are aspherical. The second positive lens L22 and the negative lens L23 are cemented with each other to be a cemented lens. The third lens group G3 is constituted only by a biconvex positive lens L31. Focusing from an object at infinity to an object at close distance (object at a finite distance) is performed by moving the third lens group G3 along the optical axis.

A variable diaphragm S1, which determines an F number, is disposed between the first lens group G1 and the second lens group G2 (in a position close to the object side of the second lens group G2), and moves together with the second lens group G2 on the same locus upon zooming from the wide-angle end state to the telephoto end state. In this example, an iris diaphragm that can change the diaphragm diameter is used as the variable diaphragm S1. A fixed diaphragm S2 is disposed between the second lens group G2 and the third lens group G3 (near the image plane I side of the second lens group G2), which moves on the same locus as the second lens group G2 upon zooming from the wide-angle end state to the telephoto end state. In this example, a flare-cut diaphragm is used as the fixed diaphragm S2. The filter group FL disposed between the third lens group G3 and the image plane I is constituted by a low pass filter, an infrared cut-off filter or the like.

Table 1 to Table 3 shown below list each data on the zoom lenses according to Example 1 to Example 3. In [General Data] in each table, values of the focal length f of the zoom lens ZL, F number Fno, angle of view 2ω, variable diaphragm diameter φ, and maximum image height Ymax are shown respectively for each state of the wide-angle end state, intermediate focal length state and telephoto end state. In [Lens Data], the first column (surface number) is the number assigned to the lens surface counted from the object side, the second column R is the radius of curvature of the lens surface, the third column D is a distance to the next lens surface on the optical axis, the fourth column nd is a refractive index at d-line (wavelength λ=587.6 nm), and the fifth column νd is an Abbe number at d-line (wavelength λ=587.6 nm). "*" attached to the right of the first column (surface number) indicates that this lens surface is aspherical. The radius of curvature "∞" indicates a plane, and the refractive index of air nd=1.000000 is omitted.

In [Aspherical Data], an aspherical coefficient is given by the following expression (A), where y denotes a height in a direction perpendicular to the optical axis, X(y) denotes a distance (sag) along the optical axis from the tangential plane at the vertex of each aspherical surface at height y to each aspherical surface, R denotes a paraxial radius of curvature (radius of curvature of the reference spherical surface), κ denotes a conical coefficient, and An denotes an aspherical coefficient at degree n (n=4, 6, 8, 10). In each example, the aspherical coefficient at degree 2, that is A2, is 0, and is omitted in the tables. In [Aspherical Data], "E-n" indicates "×10$^{-n}$".

$$X(y)=(y^2/R)/\{1+(1-\kappa \times y^2/R^2)^{1/2}\}+A4 \times y^4 + A6 \times y^6 + A8 \times y^8 + A10 \times y^{10} \quad (A)$$

In [Variable Distance Data], each value of the focal length f of the zoom lens ZL, variable distance and total length TL (length from the first optical plane to the last optical plane (image plane I) of the zoom lens ZL) is shown for each state of the wide-angle end state, intermediate focal length state and telephoto end state (focusing on infinity) respectively. The values of the back focus BFa and the total length TLa converted into an air value are also shown. In [Lens Group Focal Length], a value of the focal length of each lens group is shown. [Aspherical sag] shows a value of a maximum sag X within the effective diameter of the object side lens surface of the positive lens disposed in the position closest to the object in the second lens group G2. [Conditional Expression Correspondence Value] shows a correspondence value of each conditional expression.

In all the data values, "mm" is normally used as the unit of focal length f, radius of curvature R, and other lengths, but unit is not limited to "mm", since an equivalent optical performance is acquired even if the optical system is proportionally expanded or proportionally reduced. For the data values of the later mentioned Example 2 and Example 3 as well, numerals and characters the same as in this example are used.

Table 1 shows each data of Example 1. The radius of curvature R of Surfaces 1 to 19 in Table 1 corresponds to R1 to R19 assigned to the Surfaces 1 to 19 in FIG. 1C. The group numbers G1 to G3 in Table 1 correspond to the lens groups G1 to G3 in FIG. 1. In Example 1, the lens surfaces of Surface 2, Surface 3, Surface 4, Surface 6 and Surface 7 are formed to be aspherical respectively.

TABLE 1

[General Data]
Zoom ratio = 4.744

| | Wide-angle end state | Intermediate focal length state | Telephoto end state |
|---|---|---|---|
| f | 5.25 | 11.65 | 24.91 |
| Fno | 1.86 | 3.50 | 5.88 |
| 2ω | 89.91° | 46.47° | 22.12° |
| φ | 8.80 | 6.98 | 6.98 |
| Ymax | 4.30 | 4.85 | 4.85 |

[Lens Data]

| Surface number | R | D | nd | νd | |
|---|---|---|---|---|---|
| 1 | −325.2300 | 0.7000 | 1.81000 | 40.99 | |
| 2* | 6.4609 | 3.6126 | | | |
| 3* | 14.8609 | 1.5500 | 2.14780 | 17.34 | |
| 4* | 25.2256 | D4 | | | |
| 5 | ∞ | 0.3500 | | | (Variable diaphragm) |
| 6* | 7.9487 | 2.5500 | 1.72903 | 54.04 | |
| 7* | −103.5336 | 0.1000 | | | |
| 8 | 9.3639 | 2.6000 | 1.77250 | 49.62 | |
| 9 | −25.2879 | 0.6000 | 2.00100 | 29.14 | |
| 10 | 5.2126 | 1.0513 | | | |
| 11 | 20.5000 | 1.9000 | 1.57957 | 53.74 | |
| 12 | −23.1490 | 0.3000 | | | |
| 13 | ∞ | D13 | | | (Fixed diaphragm) |
| 14 | 24.8104 | 2.0000 | 1.60300 | 65.44 | |
| 15 | −35.7710 | D15 | | | |
| 16 | ∞ | 0.4000 | 1.51680 | 64.12 | |
| 17 | ∞ | 0.3000 | | | |
| 18 | ∞ | 0.5000 | 1.51680 | 64.12 | |
| 19 | ∞ | 0.5300 | | | |

[Aspherical Data]

Surface 2

κ = 0.2618, A4 = 1.17435E−05, A6 = 1.31694E−06,
A8 = −4.48411E−08, A10 = 3.76222E−10
SURFACE 3

κ = 1.0000, A4 = −5.84911E−05, A6 = −3.75428E−08,
A8 = 4.84872E−10, A10 = 0.00000E+00
SURFACE 4

κ = 1.0000, A4 = −8.03957E−05, A6 = 0.00000E+00,
A8 = 0.00000E+00, A10 = 0.00000E+00
SURFACE 6

κ = 0.4297, A4 = 0.00000E+00, A6 = 2.50421E−09,
A8 = 0.00000E+00, A10 = 0.00000E+00
SURFACE 7

κ = 1.0000, A4 = 5.581669E−05, A6 = −5.00534E−07,
A8 = 0.00000E+00, A10 = 0.00000E+00

TABLE 1-continued

[Variable Distance Data]

| | Wide-angle end state (infinity) | Intermediate focal length state (infinity) | Telephoto end state (infinity) |
|---|---|---|---|
| f | 5.25 | 11.65 | 24.91 |
| D4 | 19.6486 | 7.2725 | 1.6300 |
| D13 | 4.8443 | 13.5334 | 30.1052 |
| D15 | 2.8508 | 2.2801 | 2.0561 |
| TL | 46.3876 | 42.1299 | 52.8363 |
| BFa | 4.2742 | 3.7035 | 3.4795 |
| TLa | 46.0810 | 41.8233 | 52.5286 |

[Lens Group Focal Length]

| Group number | First surface of group | Group focal length (f1 to f3) |
|---|---|---|
| G1 | 1 | −12.19 |
| G2 | 6 | 12.49 |
| G3 | 14 | 24.60 |

[Aspherical sag]

X = 1.3827

[Conditional Expression Correspondence Value]

Conditional Expression (1) Nd1 = 2.14780
Conditional Expression (2) Nd2 = 2.00100
Conditional Expression (3) vd1 = 17.34
Conditional Expression (4) Nd2 + (0.05 × vd2) = 3.45800
Conditional Expression (5) X × Ymax/(fw × TLw) = 0.02441
Conditional Expression (6) f2F/f2 = 0.81860
Conditional Expression (7) Nd2F + (0.02 × vd2F) = 2.80983
Conditional Expression (8) Nd2F = 1.72903
Conditional Expression (9) ft/(−f1) = 2.04269
Conditional Expression (10) f2/(fw × ft)$^{1/2}$ = 1.09236

As a result, this example satisfies all conditional expressions (1) to (10).

Figure 2C:
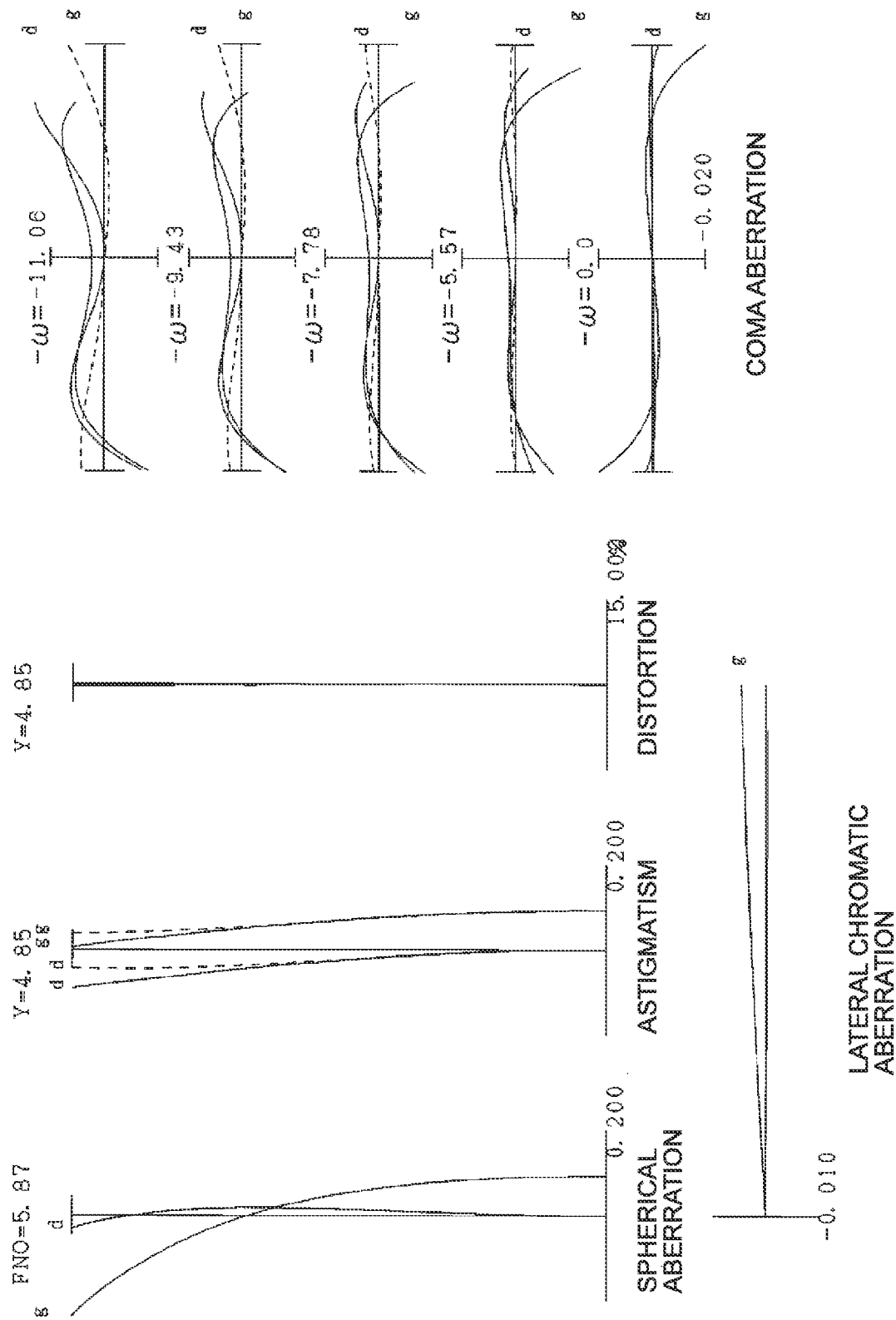
FIG. 2C is a set of graphs showing various aberrations of the zoom lens upon focusing on infinity in the telephoto end state.

FIG. 2A to FIG. 2C are graphs showing various aberrations of the zoom lens ZL1 according to Example 1. FIG. 2A is a set of graphs showing various aberrations of the zoom lens upon focusing on infinity in the wide-angle end state (f=5.25 mm), FIG. 2B is a set of graphs showing various aberrations of the zoom lens upon focusing on infinity in the intermediate focal length state (f=11.65 mm), and FIG. 2C is a set of graphs showing various aberrations of the zoom lens upon focusing on infinity in the telephoto end state (f=24.91 mm). In each graph showing aberrations, FNO is an F number, Y is an image height, and ω is a half angle of view. In each graph showing aberrations, d indicates each aberration at d-line (λ=587.6 nm), and g indicates each aberration at g-line (λ=435.8 nm). In each graph showing astigmatism, the solid line indicates the sagittal image surface, and the broken line indicates the meridional image surface. The description on the graphs showing aberrations is the same as for other examples.

As each graph showing aberrations clarifies, the zoom lens according to Example 1 has an excellent optical performance, where various aberrations are corrected well in each focal length state from the wide-angle end state to the telephoto end state. As a result, an excellent optical performance can be guaranteed for a digital still camera CAM as well, by installing the zoom lens ZL1 of Example 1.

Example 2

Example 2 of the present invention will be described next with reference to FIG. 3, FIG. 4 and Table 2. FIG. 3A shows a lens configuration of a zoom lens ZL (ZL2) according to Example 2 in a wide-angle end state, FIG. 3B shows the lens configuration in an intermediate focal length state, and FIG. 3C shows the lens configuration in a telephoto end state. The zoom lens ZL2 according to Example 2 has a same configuration as the zoom lens ZL1 of Example 1, and each component the same as Example 1 is denoted with same numerals and characters, for which detailed description is omitted.

Table 2 shows each data of Example 2. The radius of curvature R of Surfaces 1 to 19 in Table 2 corresponds to R1 to R19 assigned to the Surfaces 1 to 19 in FIG. 1C. The group numbers G1 to G3 in Table 2 correspond to the lens groups G1 to G3 in FIG. 3. In Example 2, the lens surfaces of Surface 2, Surface 3, Surface 4, Surface 6 and Surface 7 are formed to be aspherical respectively.

TABLE 2

[General Data]
Zoom ratio = 4.744

| | Wide-angle end state | Intermediate focal length state | Telephoto end state |
|---|---|---|---|
| f | 5.25 | 11.65 | 24.91 |
| Fno | 1.86 | 3.51 | 5.91 |
| 2ω | 89.95° | 46.54° | 22.12° |
| φ | 8.80 | 6.98 | 6.98 |
| Ymax | 4.30 | 4.85 | 4.85 |

[Lens Data]

| Surface number | R | D | nd | vd | |
|---|---|---|---|---|---|
| 1 | −3585.4492 | 0.8000 | 1.80139 | 45.46 | |
| 2* | 6.4743 | 3.8654 | | | |
| 3* | 13.7378 | 1.5500 | 2.14780 | 17.34 | |
| 4* | 20.3100 | D4 | | | |
| 5 | ∞ | 0.3500 | | | (Variable diaphragm) |
| 6* | 7.9337 | 2.5500 | 1.72903 | 54.04 | |
| 7* | −116.7893 | 0.1000 | | | |
| 8 | 9.8020 | 2.6000 | 1.77250 | 49.62 | |
| 9 | −24.6683 | 0.6000 | 2.00100 | 29.14 | |
| 10 | 5.3431 | 1.0513 | | | |
| 11 | 20.0937 | 1.9000 | 1.65844 | 50.84 | |
| 12 | −27.3694 | 0.3000 | | | |
| 13 | ∞ | D13 | | | (Fixed diaphragm) |
| 14 | 24.8104 | 2.0000 | 1.61800 | 63.34 | |
| 15 | −38.0505 | D15 | | | |
| 16 | ∞ | 0.4000 | 1.51680 | 64.12 | |
| 17 | ∞ | 0.3000 | | | |
| 18 | ∞ | 0.5000 | 1.51680 | 64.12 | |
| 19 | ∞ | 0.5300 | | | |

[Aspherical Data]

Surface 2

κ = 0.2112, A4 = 6.53608E−05, A6 = 1.34649E−06,
A8 = −4.84488E−08, A10 = 3.84951E−10

Surface 3

κ = 1.0000, A4 = −4.00525E−05, A6 = −1.07440E−07,
A8 = −2.66215E−09, A10 = 0.00000E+00

Surface 4

κ = 1.0000, A4 = −6.04984E−05, A6 = 0.00000E+00,
A8 = 0.00000E+00, A10 = 0.00000E+00

Surface 6

κ = 0.4152, A4 = 0.00000E+00, A6 = −8.34308E−08,
A8 = 0.00000E+00, A10 = 0.00000E+00

TABLE 2-continued

Surface 7

κ = 1.0000, A4 = 4.49491E−05, A6 = −4.78705E−07,
A8 = 0.00000E+00, A10 = 0.00000E+00

[Variable Distance Data]

|  | Wide-angle end state (infinity) | Intermediate focal length state (infinity) | Telephoto end state (infinity) |
| --- | --- | --- | --- |
| f | 5.25 | 11.65 | 24.91 |
| D4 | 19.0919 | 7.0988 | 1.6300 |
| D13 | 5.0278 | 13.9771 | 31.0494 |
| D15 | 2.9729 | 2.3943 | 2.1507 |
| TL | 46.4893 | 42.8670 | 54.2267 |
| BFa | 4.3962 | 3.8177 | 3.5740 |
| TLa | 46.1826 | 42.5603 | 53.9201 |

[Lens Group Focal Length]

| Group number | First surface of group | Group focal length (f1 to f3) |
| --- | --- | --- |
| G1 | 1 | −11.90 |
| G2 | 6 | 12.49 |
| G3 | 14 | 24.60 |

[Aspherical sag]

X = 1.3891

[Conditional Expression Correspondence Value]

Conditional Expression (1) Nd1 = 2.14780
Conditional Expression (2) Nd2 = 2.00100
Conditional Expression (3) νd1 = 17.34
Conditional Expression (4) Nd2 + (0.05 × νd2) = 3.45800
Conditional Expression (5) X × Ymax/(fw × TLw) = 0.02447
Conditional Expression (6) f2F/f2 = 0.82297
Conditional Expression (7) Nd2F + (0.02 × νd2F) = 2.80983
Conditional Expression (8) Nd2F = 1.72903
Conditional Expression (9) ft/(−f1) = 2.09247
Conditional Expression (10) f2/(fw × ft)$^{1/2}$ = 1.09236

As a result, this example satisfies all conditional expressions (1) to (10).

FIG. 4A to FIG. 4C are graphs showing various aberrations of the zoom lens ZL2 according to Example 2. FIG. 4A is a set of graphs showing various aberrations of the zoom lens upon focusing on infinity in the wide-angle end state (f=5.25 mm), FIG. 4B is a set of graphs showing various aberrations of the zoom lens upon focusing on infinity in the intermediate focal length state (f=11.65 mm), and FIG. 4C is a set of graphs showing various aberrations of the zoom lens upon focusing on infinity in the telephoto end state (f=24.91 mm). As each graph showing aberrations clarifies, the zoom lens according to Example 2 has an excellent optical performance, where various aberrations are corrected well in each focal length state from the wide-angle end state to the telephoto end state. As a result, an excellent optical performance can be guaranteed for a digital still camera CAM as well, by installing the zoom lens ZL2 of Example 2.

Example 3

Example 3 of the present invention will be described next with reference to FIG. 5, FIG. 6 and Table 3. FIG. 5A shows a lens configuration of a zoom lens ZL (ZL3) according to Example 3 in a wide-angle end state, FIG. 5B shows the lens configuration in an intermediate focal length state, and FIG. 5C shows the lens configuration in a telephoto end state. The zoom lens ZL3 according to Example 3 has a same configuration as the zoom lens ZL1 of Example 1, and each component the same as Example 1 is denoted with same numerals and characters, for which detailed description is omitted.

Table 3 shows each data of Example 3. The radius of curvature R of Surfaces 1 to 19 in Table 3 corresponds to R1 to R19 assigned to the Surfaces 1 to 19 in FIG. 5C. The group numbers G1 to G3 in Table 3 correspond to the lens groups G1 to G3 in FIG. 5. In Example 3, the lens surfaces of Surface 2, Surface 3, Surface 4, Surface 6 and Surface 7 are formed to be aspherical respectively.

TABLE 3

[General Data]
Zoom ratio = 4.743

|  | Wide-angle end state | Intermediate focal length state | Telephoto end state |
| --- | --- | --- | --- |
| f | 5.25 | 11.73 | 24.90 |
| Fno | 1.85 | 3.48 | 5.79 |
| 2ω | 89.91° | 46.20° | 22.13° |
| φ | 8.80 | 6.98 | 6.98 |
| Ymax | 4.30 | 4.85 | 4.85 |

[Lens Data]

| Surface number | R | D | nd | νd |  |
| --- | --- | --- | --- | --- | --- |
| 1 | −208.8710 | 1.0500 | 1.79050 | 44.98 |  |
| 2* | 6.2592 | 3.3000 |  |  |  |
| 3* | 13.5388 | 1.6500 | 2.00178 | 19.32 |  |
| 4* | 25.5000 | D4 |  |  |  |
| 5 | ∞ | 0.3500 |  |  | (Variable diaphragm) |
| 6* | 8.1028 | 2.5500 | 1.72903 | 54.04 |  |
| 7* | −131.0540 | 0.1000 |  |  |  |
| 8 | 9.7200 | 2.6000 | 1.77250 | 49.62 |  |
| 9 | −25.6683 | 0.6000 | 2.00100 | 29.14 |  |
| 10 | 5.4500 | 1.0519 |  |  |  |
| 11 | 23.6500 | 1.9000 | 1.65844 | 50.84 |  |
| 12 | −23.6356 | 0.3000 |  |  |  |
| 13 | ∞ | D13 |  |  | (Fixed diaphragm) |
| 14 | 24.7993 | 1.9500 | 1.61800 | 63.34 |  |
| 15 | −38.1072 | D15 |  |  |  |
| 16 | ∞ | 0.4000 | 1.51680 | 64.12 |  |
| 17 | ∞ | 0.3000 |  |  |  |
| 18 | ∞ | 0.5000 | 1.51680 | 64.12 |  |
| 19 | ∞ | 0.5300 |  |  |  |

[Aspherical Data]

Surface 2

κ = 0.1241, A4 = 8.50067E−05, A6 = 7.73935E−07,
A8 = −3.00859E−08, A10 = 2.12610E−10

Surface 3

κ = 0.2904, A4 = 0.00000E+00, A6 = 0.00000E+00,
A8 = 0.00000E+00, A10 = 0.00000E+00

Surface 4

κ = 1.0000, A4 = −5.48169E−05, A6 = 0.00000E+00,
A8 = 0.00000E+00, A10 = 0.00000E+00

Surface 6

κ = 0.4229, A4 = 0.00000E+00, A6 = 2.07774E−08,
A8 = −1.23835E−08, A10 = 3.32636E−10

Surface 7

κ = 1.0000, A4 = 4.45326E−05, A6 = −4.23707E−07,
A8 = 0.00000E+00, A10 = 0.00000E+00

TABLE 3-continued

[Variable Distance Data]

| | Wide-angle end state (infinity) | Intermediate focal length state (infinity) | Telephoto end state (infinity) |
|---|---|---|---|
| f | 5.25 | 11.73 | 24.90 |
| D4 | 19.8570 | 7.2657 | 1.6300 |
| D13 | 5.0790 | 13.9789 | 30.6294 |
| D15 | 3.0038 | 2.4268 | 2.1991 |
| TL | 47.0717 | 42.8032 | 53.5904 |
| BFa | 4.4272 | 3.8501 | 3.6225 |
| TLa | 46.7651 | 42.4966 | 53.2838 |

[Lens Group Focal Length]

| Group number | First surface of group | Group focal length (f1 to f3) |
|---|---|---|
| G1 | 1 | −12.28 |
| G2 | 6 | 12.64 |
| G3 | 14 | 24.60 |

[Aspherical sag]

X = 1.3527

[Conditional Expression Correspondence Value]

Conditional Expression (1) Nd1 = 2.00178
Conditional Expression (2) Nd2 = 2.00100
Conditional Expression (3) vd1 = 19.32
Conditional Expression (4) Nd2 + (0.05 × vd2) = 3.45800
Conditional Expression (5) X × Ymax/(fw × TLw) = 0.02353
Conditional Expression (6) f2F/f2 = 0.83456
Conditional Expression (7) Nd2F + (0.02 × vd2F) = 2.80983
Conditional Expression (8) Nd2F = 1.72903
Conditional Expression (9) ft/(−f1) = 2.02772
Conditional Expression (10) f2/(fw × ft)$^{1/2}$ = 1.10548

As a result, this example satisfies all conditional expressions (1) to (10).

FIG. 6A to FIG. 6C are graphs showing various aberrations of the zoom lens ZL3 according to Example 3. FIG. 6A is a set of graphs showing various aberrations of the zoom lens upon focusing on infinity in the wide-angle end state (f=5.25 mm), FIG. 6B is a set of graphs showing various aberrations of the zoom lens upon focusing on infinity in the intermediate focal length state (f=11.73 mm), and FIG. 6C is a set of graphs showing various aberrations of the zoom lens upon focusing on infinity in the telephoto end state (f=24.90 mm). As each graph showing aberrations clarifies, the zoom lens according to Example 3 has an excellent optical performance, where various aberrations are corrected well in each focal length state from the wide-angle end state to the telephoto end state. As a result, an excellent optical performance can be guaranteed for a digital still camera CAM as well, by installing the zoom lens ZL3 of Example 3.

According to each example, a zoom lens and an optical apparatus (digital still camera), which have compactness and ideal optical performance with a wide-angle of view, a large aperture ratio and a high zoom ratio, and a zooming method for the zoom lens, can be implemented.

In the above embodiment, the following content can be adopted within a range where the optical performance is not diminished.

In each example, the zoom lens constituted by a three-lens group was shown, but the present invention can also be applied to a configuration using a different number of lens group, such as four groups or five groups. In the configuration, a lens or a lens group may be added to the side closest to the object, or a lens or a lens group maybe added to the side closest to the image. "Lens group" refers to a portion having at least one lens isolated by an air space which changes upon zooming.

A single or a plurality of lens groups or a partial lens group may be designed to be a focusing lens group, which performs focusing from an object at infinity to an object at a short distance by moving in the optical axis direction. This focusing lens group can be applied to auto focus, and is also suitable for driving a motor for auto focusing (driving using an ultrasonic motor or the like). It is particularly preferable that the third lens group or the first lens group is designed to be the focusing lens group.

A lens group or a partial lens group may be designed to be a vibration-isolating lens group, which corrects image blurs generated by camera shake, by moving the lens group or the partial lens group in a direction perpendicular to the optical axis or rotating (oscillating) the lens group or the partial lens group in an in-plane direction, that includes the optical axis. It is particularly preferable that at least a part of the second lens group is designed to be the vibration-isolating lens group.

The lens surface may be formed to be a spherical surface or a plane, or an aspherical surface. If the lens surface is a spherical surface of a plane, lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop is disposed near the second lens group, but the role of the aperture stop may be substituted by the frame of the lens, without disposing a separate element as the aperture stop.

Each lens surface may be coated with an anti-reflection film which has high transmittance in a wide wavelength region in order to decrease flares and ghosts, and implement a high optical performance with high contrast.

The zoom ratio of the zoom lens (zooming optical system) of this embodiment is about 2.5 to 10.

The zoom lens (zooming optical system) of this embodiment is used for a digital still camera, but the present invention is not limited to this, but may also be used for other optical apparatuses, such as a digital video camera.

EXPLANATION OF NUMERALS AND CHARACTERS

CAM digital still camera (optical apparatus)
ZL zoom lens
G1 first lens group
G2 second lens group
G3 third lens group
S1 variable diaphragm S2 fixed diaphragm
I Image plane

RELATED APPLICATIONS

This is a continuation of PCT International Application No. PCT/JP2014/000302, filed on Jan. 22, 2014, which is hereby incorporated by reference. This application also claims the benefit of Japanese Patent Application No. 2013-010348, filed in Japan on Jan. 23, 2013, which is hereby incorporated by reference.

The invention claimed is:

1. A zoom lens comprising, in order from an object along an optical axis:
a first lens group having negative refractive power;
a second lens group having positive refractive power; and
a third lens group having positive refractive power,
at least the first lens group and the second lens group being moved along the optical axis upon zooming from a wide-angle end state to a telephoto end state, so that a distance between the first lens group and the second lens group decreases, and a distance between the second lens group and the third lens group increases,
the first lens group including one positive lens,
the second lens group including at least one negative lens, and
the following conditional expressions being satisfied:

$$2.00 < Nd1 < 2.50$$

$$2.00 < Nd2 < 2.50$$

$$16.0 < vd1 < 20.0$$

where Nd1 denotes a refractive index of the positive lens of the first lens group at d-line,
Nd2 denotes a refractive index of at least one negative lens of the second lens group at d-line, and
vd1 denotes an Abbe number of the positive lens of the first lens group at d-line.

2. The zoom lens according to claim 1, wherein a variable diaphragm to determine an F number is disposed near the object side of the second lens group.

3. The zoom lens according to claim 1, wherein the second lens group includes one negative lens as the at least one negative lens.

4. The zoom lens according to claim 1, wherein the following conditional expression is satisfied:

$$3.20 < Nd2 + (0.05 \times vd2) < 3.70$$

where vd2 denotes an Abbe number of at least one negative lens of the second lens group at d-line.

5. The zoom lens according to claim 1, wherein the second lens group includes a positive lens disposed in a position closest to the object in the second lens group, and
an object side lens surface of the positive lens disposed in the position closest to the object in the second lens group is aspherical.

6. The zoom lens according to claim 1, wherein the second lens group includes a positive lens disposed in a position closest to the object in the second lens group, and
an object side lens surface of the positive lens disposed in the position closest to the object in the second lens group is an aspherical surface of which radius of curvature increases in a direction from the optical axis to a periphery of the lens.

7. The zoom lens according to claim 1, wherein the second lens group includes a positive lens disposed in a position closest to the object in the second lens group,
an object side lens surface of the positive lens disposed in the position closest to the object in the second lens group is an aspherical surface of which radius of curvature increases in a direction from the optical axis to a periphery of the lens, and
the following conditional expression is satisfied:

$$0.018 < X \times Y\max/(fw \times TLw) < 0.040$$

where X denotes a maximum sag in an effective diameter of the object side lens surface of the positive lens disposed in the position closest to the object in the second lens group,
Ymax denotes a maximum image height of the zoom lens in the wide-angle end state,
fw denotes a focal length of the zoom lens in the wide-angle end state, and
TLw denotes a total length of the zoom lens in the wide-angle end state.

8. The zoom lens according to claim 1, wherein the second lens group includes a positive lens disposed in a position closest to the object in the second lens group, and
the following conditional expression is satisfied:

$$0.60 < f2F/f2 < 1.10$$

where f2F denotes a focal length of the positive lens disposed in the position closest to the object in the second lens group, and
f2 denotes a focal length of the second lens group.

9. The zoom lens according to claim 1, wherein the second lens group includes a positive lens disposed in a position closest to the object in the second lens group, and
the following conditional expressions are satisfied:

$$2.60 < Nd2F + (0.02 \times vd2F) < 3.00$$

$$1.65 < Nd2F < 1.85$$

where Nd2F denotes a refractive index of the positive lens disposed in the position closest to the object in the second lens group at d-line, and
vd2F denotes an Abbe number of the positive lens disposed in the position closest to the object in the second lens group at d-line.

10. The zoom lens according to claim 1, wherein the following conditional expression is satisfied:

$$1.80 < ft/(-f1) < 2.40$$

where ft denotes a focal length of the zoom lens in the telephoto end state, and
f1 denotes a focal length of the first lens group.

11. The zoom lens according to claim 1, wherein the following conditional expression is satisfied:

$$0.95 < f2/(fw \times ft)^{1/2} < 1.25$$

where f2 denotes a focal length of the second lens group,
fw denotes a focal length of the zoom lens in the wide-angle end state, and
ft denotes a focal length of the zoom lens in the telephoto end state.

12. The zoom lens according to claim 1, wherein the first lens group is constituted by, in order from the object along the optical axis, one negative lens and one positive lens.

13. The zoom lens according to claim 1, wherein a lens disposed in a position closest to the object in the first lens group has an aspherical surface.

14. The zoom lens according to claim 1, wherein a lens disposed in a position closest to an image in the first lens group has an aspherical surface.

15. The zoom lens according to claim 1, wherein the second lens group includes, in order from the object along the optical axis, a first positive lens, a second positive lens and a negative lens.

16. The zoom lens according to claim 1, wherein the second lens group includes, in order from the object along the optical axis, a first positive lens, a second positive lens, a negative lens and a third positive lens.

17. The zoom lens according to claim 1, wherein the second lens group includes, in order from an image along the optical axis, a positive lens and a negative lens.

18. An optical apparatus, comprising:
a zoom lens that forms an image of an object on a predetermined surface,
the zoom lens being the zoom lens according to claim 1.

19. A manufacturing method for a zoom lens, comprising
disposing, in order from an object along an optical axis, a first lens group having negative refractive power, a second lens group having positive refractive power, and a third lens group having positive refractive power;
moving at least the first lens group and the second lens group along the optical axis upon zooming from a wide-angle end state to a telephoto end state, so that a distance between the first lens group and the second lens group decreases, and a distance between the second lens group and the third lens group increases;
disposing one positive lens as the first lens group;
disposing at least one negative lens as the second lens group; and
allowing the following conditional expressions to be satisfied:

$2.00 < Nd1 < 2.50$ $2.00 < Nd2 < 2.50$ $16.0 < vd1 < 20.0$ where Nd1 denotes a refractive index of the positive lens of the first lens group at d-line,
Nd2 denotes a refractive index of at least one negative lens of the second lens group at d-line, and
vd1 denotes an Abbe number of the positive lens of the first lens group at d-line.

20. The manufacturing method for a zoom lens according to claim 19, wherein
the following conditional expression is satisfied:

$3.20 < Nd2 + (0.05 \times vd2) < 3.70$ where vd2 denotes an Abbe number of at least one negative lens of the second lens group at d-line.

21. The manufacturing method for a zoom lens according to claim 19, wherein
a positive lens is disposed in a position closest to the object in the second lens group, and
the following conditional expression is satisfied:

$0.60 < f2F/f2 < 1.10$ where f2F denotes a focal length of the positive lens disposed in the position closest to the object in the second lens group, and
f2 denotes a focal length of the second lens group.

22. The manufacturing method for a zoom lens according to claim 19, wherein
the following conditional expression is satisfied:

$1.80 < ft/(-f1) < 2.40$ where ft denotes a focal length of the zoom lens in the telephoto end state, and
f1 denotes a focal length of the first lens group.

23. The manufacturing method for a zoom lens according to claim 19, wherein
the following conditional expression is satisfied:

$0.95 < f2/(fw \times ft)^{1/2} < 1.25$ where f2 denotes a focal length of the second lens group,
fw denotes a focal length of the zoom lens in the wide-angle end state, and
ft denotes a focal length of the zoom lens in the telephoto end state.

* * * * *